United States Patent
Briand et al.

(10) Patent No.: US 7,190,842 B2
(45) Date of Patent: Mar. 13, 2007

(54) ELEMENTARY CELL OF A LINEAR FILTER FOR IMAGE PROCESSING

(75) Inventors: Gérard Briand, Ploufragan (FR); Jean-Yves Babonneau, L'Hermitage (FR); Didier Doyen, La Bouexière (FR); Patrice Lesec, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 724 days.

(21) Appl. No.: 10/257,347

(22) PCT Filed: Mar. 28, 2001

(86) PCT No.: PCT/EP01/03523

§ 371 (c)(1),
(2), (4) Date: Oct. 10, 2002

(87) PCT Pub. No.: WO01/77881

PCT Pub. Date: Oct. 18, 2001

(65) Prior Publication Data

US 2003/0145024 A1    Jul. 31, 2003

(51) Int. Cl.
*G06K 9/40* (2006.01)
*H04B 1/10* (2006.01)
*G06F 17/10* (2006.01)

(52) U.S. Cl. .................. 382/260; 375/350; 708/316; 708/318

(58) Field of Classification Search ............... 382/260, 382/261, 262, 263, 264, 265; 348/720, 721; 375/350; 708/300, 301, 316, 318; 327/552

See application file for complete search history.

(56) References Cited

U.S. PATENT DOCUMENTS

| 4,827,533 | A | * | 5/1989 | Tanaka ..................... 382/262 |
| 5,450,339 | A |   | 9/1995 | Chester et al. ......... 364/724.19 |
| 5,875,122 | A |   | 2/1999 | Acharya ................ 364/726.05 |
| 5,959,693 | A | * | 9/1999 | Wu et al. .................... 348/624 |

FOREIGN PATENT DOCUMENTS

EP    352 867 A2    1/1990

OTHER PUBLICATIONS

Jong-Hun Kim et al., *Lowpass Temporal Filter Using Motion Adaptive Spatial Filtering and Its Systolic Realization*, Aug. 1992, IEEE Transactions on Consumer Electronics 38, No. 3, pp. 452-459.
Jin Yung Zhang et al., *High Speed Architectures for Two-Dimensional State-Space Recursiv Filtering*, Jun. 1990, IEEE Transactions on Circuits and Systems 37, No. 6, New York, pp. 831-836.
Search Report*.

* cited by examiner

*Primary Examiner*—Yon J. Couso
(74) *Attorney, Agent, or Firm*—Joseph J. Laks; Ronald H. Kurdyla

(57) ABSTRACT

The present invention relates to an elementary cell of a linear filter for image processing, as well as to a corresponding module, element and process. The cell comprises a data circulation output and a calculation output, as well as a main delay line and an auxiliary delay line in parallel. Delay line selection means (MUX4) make it possible to link the input of the cell to the circulation output by way of one or other of the delay lines. The cell also comprises an adder having two inputs which can be linked respectively to the input of the cell and to the output of the main delay line, by calculation selection means (MUX1, MUX2) and a multiplier at the output of the adder, connected to a multiplier coefficients memory. Application to linear filtering for image processing and to random access for motion compensation.

12 Claims, 11 Drawing Sheets

ELEMENTARY CELL OF A LINEAR FILTER FOR IMAGE PROCESSING

This application claims the benefit under 35 U.S.C. §365 of International Application PCT/EP01/03523, filed Mar. 29, 2001, which claims the benefit of French Application 0007851, filed Jun. 20, 2000 and which claims the benefit of European Application No. 00400991.6, filed Apr. 10, 2000.

The present invention concerns an elementary cell of a linear filter for image processing, as well as an associated module, element and process.

BACKGROUND OF THE INVENTION

Systolic architecture structures are known which make it possible to perform linear spatial filtering in a modular and flexible manner. Such structures comprise elementary cells in cascade. Each of them is provided with a register making it possible to impose a delay of a point, a memory capable of storing multiplier coefficients, a multiplier for performing multiplications by these coefficients of the data received and an adder intended for sequentially adding the products obtained to the sum of the products originating from the downstream cells.

Such embodiments will be found in the article "Real-Time Systolic Array Processor for 2-D Spatial Filtering", by Aboulnasr and Steenaart, IEEE Transactions on Circuits and Systems, Vol. 35, No. 4, Apr. 1988, pp. 451–455 and in the article "High-Speed Architectures for Two-Dimensional State-Space Recursive Filtering", by Zhang and Steenaart, IEEE Transactions on Circuits and Systems, Vol. 37, No. 6, Jun. 1990, pp. 831–836.

BRIEF SUMMARY OF THE INVENTION

The subject of the present invention is an elementary cell based on a novel linear filter architecture, which allows a reduction in the number of cells required and an appreciable improvement in the processing efficiency, in particular in terms of consumption, in the presence of horizontal and/or vertical symmetries in the filtering coefficients.

The present invention also relates to a cell of this kind which permits image expansions and compressions while offering the above advantages, in particular within the framework of multiphase interpolation.

The cell of the invention can also be adapted to random access, in particular for interpolation with motion compensation.

The invention furthermore relates to a linear filtering module based on such cells, as well as to a linear filtering element relying on the cooperation of several modules.

The element of the invention can allow the implementation of horizontal and/or vertical spatio-temporal filtering with increased efficiency.

The subject of the invention is moreover a linear filtering process having the abovementioned advantages.

Accordingly, the invention relates to an elementary cell of a linear filter for image processing, comprising:
  an input, intended to sequentially receive data relating to pixels of an image to be processed,
  a circulation output, intended to sequentially transmit these data with a delay,
  a calculation output, intended to sequentially transmit results obtained by a processing of these data in the said cell,
  a main delay line having an input capable of being linked to the input of the cell and an output capable of being linked to the circulation output and to the calculation output of the cell,
  a coefficients memory, provided so as to contain at least one multiplier coefficient, and
  a multiplier connected to the coefficients memory, having an input and an output which are capable of being linked respectively to the output of the delay line and to the calculation output of the cell, this multiplier being intended to perform multiplications on the data received at the input of the multiplier by at least one of the multiplier coefficients of the coefficients memory and to transmit via the output of the multiplier the result obtained.

According to the invention, the main delay line is capable of producing a maximum shift corresponding to at least two pixels of the image to be processed and in that the cell also comprises:
  an auxiliary delay line having an input and an output which are capable of being linked respectively to the input of the cell and to the circulation output of the cell,
  an adder having a first and a second input which are capable of being linked respectively to the input of the cell and to the output of the main delay line, and an output capable of being linked to the multiplier,
  delay line selection means having a first and a second state, these means being intended to link the input of the cell to the circulation output of the cell by way of the main delay line in the first state and by way of the auxiliary delay line in the second state,
  and calculation selection means having at least two states, these means being intended to link the input of the cell and/or the output of the main delay line to the corresponding inputs of the adder, in these states respectively.

The expression "delay line" should be understood to mean any system which can impose a delay of one or more pixels in the sequential data stream, including a register.

Thus, the cell of the invention differs in particular from those of the state of the art through the presence of a main delay line which makes it possible to impose delays greater than a pixel. Unlike the existing cells, it permits horizontal and/or vertical symmetries to be taken into account by virtue of the possible use of two delay lines in parallel and of the presence of an adder which can form the sum of the data at the input and at the output of the main delay line. This cell therefore makes it possible to impose a delay corresponding to the relevant symmetry, in the main delay line, whilst imposing another delay corresponding to the transmission of the data downstream of the cell (for example of a pixel or of a line) in the auxiliary delay line.

It should be noted that with the improvement of efficiencies in the fabrication of dynamic RAM memories and the appearance of more precise technologies, it is possible to include same in the elements in significant quantities for line memories, and in more limited quantities for frame memories. Such RAMs are advantageously used for the main delay lines, and possibly auxiliary delay lines, of the cells of the invention. These cells thus allow a flexible architecture, making it possible to access a multitude of spatio-temporal filter structures conventionally encountered in video processing applications, simply by reconfiguring the interconnections between operators employed.

The cell of the invention makes it possible to build a reconfigurable network making it possible to satisfy, by simple parameterization, applications including spatio-temporal filtering or frame interpolation with motion compensation.

According to a preferred implementation, the cell of the invention is adopted for a single-development ASIC circuit which can target a considerable number of applications which call upon filtering.

According to another preferred implementation, the cell of the invention is utilized in a VLSI circuit, which has the advantage of being more optimized as regards area of silicon. One particular structure is then advantageously selected from the possible structures, so as to define one and only one interconnection configuration satisfying a single targeted application.

In both these implementations, the cell network obtained and the associated interconnection system, by dint of their regularity, lead to the simplicity of the placement/routing which relies on repetition of identical blocks. Moreover, the number of cells used can be altered, and may be reduced or increased.

According to yet another advantageous implementation, the cell of the invention is used in an FPGA circuit (Field Programmable Gate Array).

The cell of the invention has the advantage of being able to fulfil spatio-temporal filtering and random access functions. It therefore caters particularly well for the requirements of frame interpolation encountered in the conversion of video standards, frame timing conversion (upconversion for television or PC) and image format conversion (for example from the TV format to the HD TV format).

Filtering in the vertical or horizontal axis of the image or the time axis of a sequence, involved in these applications, requires the use of line memories and/or frame memories whose number and management are preferably optimized. The architecture relying on the cell of the present invention permits this optimization, thereby avoiding any novel investigation from the conceptual standpoint.

Preferably, at least one of the delay lines comprises at least one dynamic RAM.

Advantageously, the second input of the adder is capable of being linked not only to the output of the main delay line, but also to the output of the auxiliary delay line. The calculation selection means then make the corresponding connection possible.

In a first advantageous embodiment of the delay lines, the main and auxiliary delay lines are respectively capable of producing maximum shifts of at least one line and one point, the auxiliary delay line preferably comprising a register.

This embodiment is adapted for taking into account horizontal symmetries. It has the advantage of employing just a simple register for the auxiliary delay line. By way of example, the shifting capacity of the main delay line is ten lines.

According to a second advantageous embodiment of the delay lines, the main and auxiliary delay lines are respectively capable of producing maximum shifts of at least two lines and at least one line.

This embodiment, for its part, is adapted for taking into account both horizontal and vertical symmetries, but it requires the use of two lines with adequate FIFO memories (which may in particular comprise RAMs). In the presence of purely vertical symmetries (pure vertical filter, rectangular filter with no horizontal symmetries), the filter obtained from such cells offers savings in consumption. By way of example, the shifting capacities of the main and auxiliary delay lines are ten lines and one line respectively.

In the presence of both horizontal and vertical symmetries, the horizontal symmetries are preferably favoured by the employing of the first embodiment. This choice is in fact economical. However, employing the second embodiment may still be advantageous in the presence of vertical symmetries with no conflict with horizontal symmetries (cross filter, central column of a rectangular filter also having horizontal symmetries).

The data relating to each pixel correspond to the components considered for this pixel. Thus, a pixel can in particular be associated with a single component, of luminance or of chrominance, by the use of one word (of 10 bits for example). It can also be associated with three components (one luminance component and two chrominance components), through the use of three words.

Advantageously, the coefficients memory consists of a memory intended for storing a bank of coefficients and the cell comprises means for selecting one of these coefficients.

Thus, the coefficients may be downloaded just once during initialization of the system, and be selected for each of the cells at the moment of filtering.

In a preferred embodiment, the cell comprises shift disabling means for at least one of the delay lines.

These disabling means permit image expansion, by temporal freezings of the data circulating in the cells, possibly corresponding to point disablings and/or line disablings.

The calculation selection means advantageously comprise:
a first multiplexer having a first input linked to the input of the cell, a second input linked to the zero and an output linked to the first input of the adder corresponding to the input of the cell, and
a second multiplexer having a first input linked to the output of the main delay line, a second input linked to the zero and an output linked to the second input of the adder corresponding to the output of the main delay line.

Moreover, the cell preferably comprises at least one control line intended for downloading control information to at least one item of the cell, the control lines being chosen from:
at least one line for addressing multiplier coefficients intended for the coefficients memory,
at least one line for addressing parameters for selecting coefficients, intended for the coefficients memory, these parameters preferably consisting of address bits,
at least one line for addressing data for activating and for deactivating the shift disabling means, these data preferably comprising information on the linewise and pointwise shift disabling,
at least one line for addressing delay selection parameters, intended for at least one of the delay lines,
at least one line for addressing state selection parameters, intended for the delay line selection means and/or calculation selection means, these parameters preferably consisting of state control bits,
and any combination of these addressing lines.

The delay line selection and/or calculation selection means advantageously comprise switches, such as multiplexers, that is to say items having steering functions.

Moreover, the subject of the invention is a module of a linear filter for image processing, comprising at least two cells in accordance with the invention. These cells are arranged in cascade in the module and consist of an input cell, intermediate cells and an output cell. The module also comprises addition means linked to the calculation outputs of the cells and having an input linked to the input of the input cell, a circulation output linked to the circulation output of the output cell and a calculation output downstream of the addition means.

Advantageously, the cells are identical and/or four in number.

Preferably, for the sum of results originating from more than two cells, the addition means comprise adders each having two inputs and one output, which are arranged in series in several strata, in a pyramidal manner.

According to an advantageous embodiment, the module comprises random access selection means, in particular for motion compensation, having a first and a second state. These means are intended to connect the input of each of the cells to the first input of the adder of this cell in the first state, and the output of at least one of the delay lines of each of the cells to the first input of the adder of one of these cells in the second state.

This embodiment can be used in particular for motion-compensated interpolation. By cascading several cells according to the invention, a sliding window is in fact created in which it is possible to access pixels at any, nonsequential position.

In an advantageous form of this embodiment with random access, the main delay line of each module is associated with a dual port RAM, which makes it possible to increase the access capacities. In another advantageous embodiment, employing line memories of sufficient capacity, these delay lines themselves serve to obtain the desired accesses. In a variant embodiment, the auxiliary delay lines are also used for random access, preferably in parallel with the main delay lines.

The disposition of the line memories for random access is flexible and makes it possible to vary the dimension of the access window as a function of requirements, for example of the amplitude of the motion vectors in a motion-compensated filter. Moreover, according to an advantageous embodiment, the line memories and optionally the associated RAMs are provided so as to permit splitting over two adjacent video frames, this allowing simultaneous access to both these frames.

The invention also relates to a linear filtering element for image processing, comprising at least two modules in accordance with the invention, this element also comprising addition means linked to the calculation outputs of at least two of the modules.

It is thus seen that the element of the invention can exhibit the following various advantages, separately or in combination according to the embodiments concerned:
  offer a multi-purpose and flexible architecture making it possible to access a multitude of spatio-temporal filter structures and interpolators with motion compensation by simple software reprogramming of certain parameters,
  be the basis of an architecture using a limited number of types of different items thus reducing the development time,
  permit an architecture using an optimized number of inputs/outputs, this representing a heavy constraint when an element is targeted,
  allow regularity of the architecture leading to fast placement/routing, due in particular to the repetitive basic modules.

Advantageously, the modules are arranged in cascade and the element also comprises input selection means having a first and a second state, arranged between at least one of the modules, the so-called upstream module, and the consecutive module the so-called downstream module. These input selection means are intended to link the input of the upstream module to the circulation output of the downstream module in the first state, and to an additional input line in the second state.

This embodiment is a flexible way of permitting the employing of spatio-temporal filterings. Specifically, by placing modules in series it is possible to circulate a video signal in succession through these modules for spatial filtering, whilst by placing modules in parallel it is possible to introduce several video signals associated with various instants and thus to permit temporal filtering.

Advantageously, the modules of the element are identical and/or four in number.

Preferably, for the sum of results originating from more than two modules, the addition means comprise adders each having two inputs and one output, arranged in series in several strata, in a pyramidal manner.

The invention also applies to a linear filtering process for image processing, in which:
  data relating to pixels of an image to be processed are sent sequentially to inputs of elementary cells in cascade, while respectively imposing, in these cells, transmission delays for these data,
  multiplications by multiplier coefficients are performed in at least one part of these cells on the data received by these cells, so as to obtain products, and these products are added together.

According to the invention, in at least one of the cells:
  a main delay and an auxiliary delay less than the main delay are imposed on the data received by the cell, by means of two delay lines, respectively main and auxiliary, in parallel,
  the data received by the cell are added together, upstream and downstream of the main delay line so as to obtain sums and the multiplications are performed on these sums, and
  the data received by this cell are transmitted downstream of the cell, with the auxiliary delay.

BRIEF DESCRIPTION OF THE DRAWINGS

The invention will be better understood and illustrated by means of the following exemplary embodiments and implementations, which are in no way limiting, with reference to the appended drawings in which.

Figure 1:
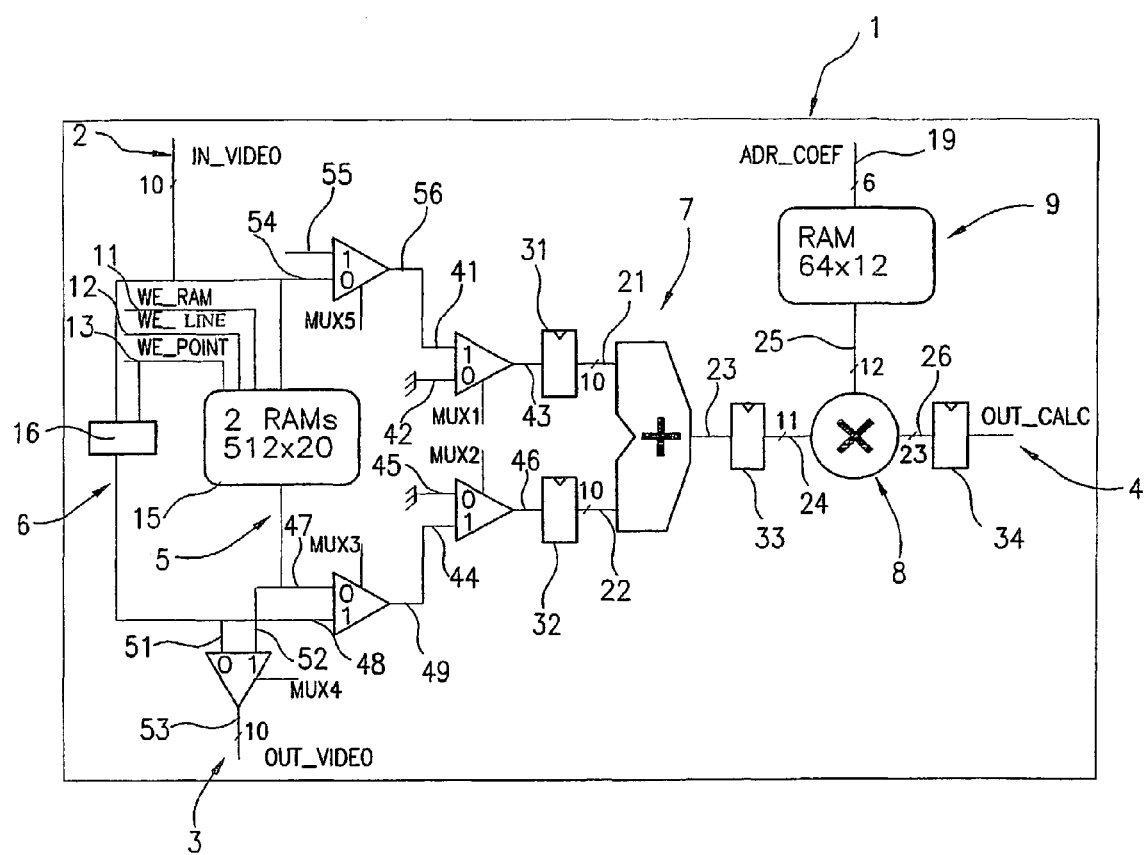
FIG. 1 represents a particular embodiment of an elementary cell in accordance with the invention.

The content of these figures should be regarded not only as illustrative, but also as complementary to the description.

DETAILED DESCRIPTION OF THE INVENTION

In the figures, identical or similar items are denoted by the same references.

The schematic representations of FIGS. 5 to 7 and 14 to 16 show only the items required for the understanding of the examples. They are obtained by constructing various filters through appropriate configurations of the multiplexers of the system. Thus, in particular, these representations do not take account of the fact that each multiplier is associated with a bank of coefficients and the shifting and rounding operations on the results are not represented.

The present description comprises a first part developing embodiments centred around linear filtering (with reference to FIGS. 1 to 9), and a second part devoted to random access for motion compensation (with reference to FIGS. 10 to 16). The embodiments of the second part are derived from those of the first part, by adding specific items to certain blocks.

Throughout what ensues, a "module" denotes a functional entity based on an assemblage of elementary cells, and a "network", a functional entity based on an assemblage of modules (hence of cells) and which is the basis of an element. In the examples described, the cells of a network are all identical, and interconnected with one another by multiplexers and adders.

Moreover, the terms "pixel" or "point" are understood hereinafter for simplicity to mean the data relating to a pixel, which are transmitted by a video line.

The exemplary architectures which follow employ 16 basic cells, the pixels being represented by 10-bit words. In variant embodiments, the number of elementary cells is higher and/or the word widths are different.

According to an advantageous embodiment, several networks are cascaded, the implementation of a network being limited for example to sixteen cells. This embodiment is applicable to the two functionalities of linear filtering and random access. It makes it possible to solve the problems of limiting the footprint or area of each element, whilst making it possible to obtain wider filters in linear filtering mode, and larger vector amplitudes in random access mode.

An elementary cell 1 (also referred to as a basic cell) in accordance with the invention (FIG. 1) has an input 2 for a video signal (IN_VIDEO line), an output 3 for a video signal after delay (OUT_VIDEO line) and an output 4 for a calculation result (OUT_CALC line). It comprises:

one delay line (LAR) 5 which can be disabled (by a WE_LINE control line 12, with WE standing for Write Enable) whose capacity ranges from 1 point to 2055 points on 10 bits, one register 16 which can be disabled (by a WE_POINT control line 13) in parallel with the LAR 5, which forms an auxiliary delay line 6, one adder 7 with two 10-bit inputs 21 and 22 and one 11-bit output 23, two 10-bit registers 31 and 32 at the head end of the adder 7 (inputs 21 and 22 respectively), one 11-bit register 33 at the output 23 of the adder 7, one multiplexer MUX4 for generating (output 53) the signal at the output 3 of the cell 1, from the register 16 (input 51) or from the LAR 5 (input 52), one multiplexer MUX3 for generating (output 49) a video emanating from the LAR 5 (input 47) or from the register 16 (input 48), one multiplexer MUX5 making it possible to select at the output 56 the input signal (input 54) or a return for random access (input 55), two multiplexers MUX1 and MUX2, MUX1 having a first input 41 linked to the output 56 of MUX5, a second input 42 at 0 and an output 43 linked to the adder 7 and MUX2 having a first input 44 linked to the output 49 of MUX3, a second input 45 at 0 and an output 46 linked to the adder 7, making it possible to force the videos to 0 at the inputs 21 and 22 of the adder 7, one multiplier 8 of 11 bits (input 24) by 12 bits (input 25) with output 26 of 23 bits to the output 4 of the cell 1, one RAM bank 9 of 64 12-bit coefficients linked to the input 25 of the multiplier 8 and addressable by a 6-bit ADR_COEF addressing line 19, this bank 9 comprising a 64×12 dual port RAM, one 12-bit register at the output of the bank 9 of coefficients and one 23-bit register 34 at the output of the multiplier 8.

The delay line 5 is obtained through the association 15 of two 512×20 single-port RAMs. This association 15 operates (in respect of linear filtering) as a single block whose delay lies between 1 and 2048 clock cycles and is supplemented with registers and multiplexers (which lead to a delay of 2055 points). In other embodiments, it is replaced by any other line memory organized as a FIFO, whose depth is programmable.

This basic cell 1 effects the product between a video pixel and one of the coefficients emanating from the bank 9. The multiplexers MUX1 and MUX2 define the video input, or the added video inputs, of the multiplier 8. The multiplexer MUX4 defines the video used on the next cell, the multiplexer MUX3 directs the video used on the input 22 of the adder 7 and the multiplexer MUX5 directs the video used on the input 21 of the adder 7. The five multiplexing bits, the delay value programmed in the LAR 5 and the coefficients contained in the bank 9 are all needed to configure this cell 1.

The cell 1 is configured in particular at the level of the five 10-bit multiplexers MUX1, MUX2, MUX3, MUX4 and MUX5. Five positioning bits are therefore necessary, distributed over a single byte. The coefficients also form part of the configuration: they are downloaded during an initialization phase, just like the positioning bits for the multiplexers, and remain the same throughout the operating phase corresponding to this configuration.

During the operating phase, a certain number of check bits are dynamically switchable at the pixel rate. This is the case for:
- addressing bits (line 19) of the bank 9 of coefficients: make it possible to assign the coefficient which is appropriate to within a pixel,
- bits WE_LG (line 12) and WE_PT (line 13): make it possible to disable the linewise and pointwise shifting of the video, required in particular in filters for expanding image format in the vertical and/or horizontal direction.

The basic cell 1 disclosed is multi-purpose and flexible: it makes it possible to construct filters of variable configuration according to the horizontal and vertical dimensions of the image, or according to the temporal dimension.

The interconnecting of the basic cells relies on three steps: formation of modules each grouping together four basic cells, association of the modules in a final network and selection and formatting of the signals intended to be directed to the output of the network.

Each module 60 (FIG. 2) comprises:
- four basic cells 61, 71, 81 and 91 in series (respectively having inputs 62, 72, 82 and 92, circulation outputs 63, 73, 83 and 93 and calculation outputs 64, 74, 84 and 94),
- two adders 101 and 102 having 23-bit inputs 102 and 103 (adder 101) and 106 and 107 (adder 105) respectively linked to the calculation outputs 64, 74, 84 and 94 of the cells 61, 71, 81 and 91 and 24-bit outputs 104 (adder 101) and 108 (adder 105) and
- one adder 110 having 24-bit inputs 111 and 112 respectively linked to the outputs 104 and 108 of the adders 101 and 105 and a 25-bit output 113.

The sum of the added results from four multipliers 68, 78, 88 and 98 respectively of the cells 61, 71, 81 and 91 is obtained at the output 114 (calculation output coming from the calculation output 113 of the adder 110) of this module 60. The input video delayed by the sum of the delays produced in each of the cells of the module 60 is also available (circulation output 93).

This module 60 of four cells is designed so as to be furnished with just one video input 62, but it can be configured either in vertical or horizontal mode.

A final network 120 (FIG. 3) is furnished with four modules 130, 140, 150 and 160 of four basic cells each. The association of these modules can make it possible to obtain a filter with 16 coefficients, but it is also possible to employ the four results from the four modules separately or else two results originating from the sum of two modules.

The network 120 of the example illustrated comprises:
- four cascaded filter modules 130, 140, 150 and 160, respectively having inputs 132, 142, 152 and 162, direct video outputs (circulation outputs) 133, 143, 153 and 163 and calculation outputs 134, 144, 154 and 164,
- four 10-bit registers 138, 148, 158 and 168 respectively at the circulation outputs 133, 143, 153 and 163 (outputs to OUT_VIDEO1 . . . 4 lines),
- four 25-bit registers 139, 149, 159 and 169 respectively at the calculation outputs 134, 144, 154 and 164 163 (outputs to OUT_CALC1 . . . 4 lines),
- three multiplexers 141, 151 and 161 respectively associated with the three modules 140, 150 and 160, each respectively having an output 147, 157 and 167 linked to the input 142, 152 and 162 of the corresponding module, a first 10-bit input 145, 155 and 165 linked to the circulation output 133, 143 and 153 of the upstream module 130, 140 and 150 and a second 10-bit input 146, 156 and 166 for video input lines IN_VIDEO2, IN_VIDEO3 and IN_VIDEO4,
- two 25-bit adders 170 and 175 adding pairwise the calculation results from the modules 130 and 140 on the one hand (inputs 171 and 172 of the adder 170) and from the modules 150 and 160 on the other hand (inputs 176 and 177 of the adder 175), so as to produce 26-bit sums (outputs 173 and 178 respectively),
- two 26-bit registers 174 and 179 respectively at the outputs 173 and 178 of the adders 170 and 175 (outputs to OUT_CALC12 and OUT_CALC34 lines),
- one 26-bit adder 180 having inputs 181 and 182 respectively linked to the registers 174 and 179, producing at the output 183 the sum OUT1234 of the calculation results from the four modules 130, 140, 150 and 160,
- one multiplexer 195 for selecting a cascade input (IN_CASCAD line) originating from an upstream network (input 196), or from the earth (input 197), having an output 198,
- one assembly 184 of four 26-bit registers at the output 183 of the adder 180, for the resetting of OUT1234 on the cascade input,
- one multiplexer 185 giving at the output 188 the sum OUT1234, either by direct connection to the output 183 of the adder 180 (input 186) or by way of the assembly 184 of registers (delay for cascade input, input 187),
- one 30-bit adder 190 making it possible to cascade the networks of filters, having a first input 191 linked to the output 198 of the multiplexer 195, a second input 192 linked to the output 188 of the multiplexer 185 and an output 193 and
- one 30-bit register at the output 193 of the cascade adder 190 (output to an OUT_CASCAD line).

The new configuration parameters required are those relating to the multiplexers 141, 151 and 161 (video input selections) and to the multiplexer 195 (consideration of an upstream network).

The formatting and the multiplexing of the signals is performed in such a way as to obtain a splitting of the inputs/outputs representing a compromise between flexibility of access to the data and number of inputs/outputs. The latter number is in general a heavy constraint, in particular in the case of a VLSI implementation.

In general, the number and the arrangement of the multiplexers are optimized in such a way as to access various filter combinations provided for by the structure.

Figure 4:
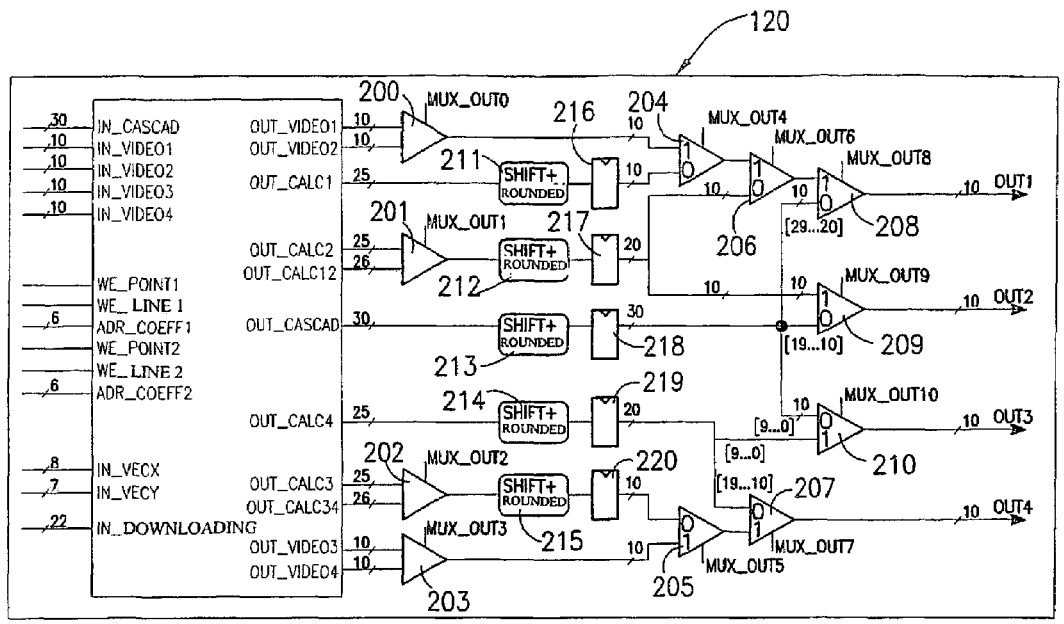
FIG. 4 represents complementary implementational items for formatting and for multiplexing of the element of FIG. 3.

In the embodiment disclosed, the network 120 supplemented with formatting and multiplexing information (as illustrated in FIG. 4) comprises as inputs the following lines:
- IN_CASCAD: 30-bit cascade input making it possible to associate several networks,
- IN_VIDEO 1 . . . 4: four video trains, making it possible to access the modules 130, 140, 150 and 160 respectively,
- ADR_COEFF1 . . . 2: addressing of the coefficients preloaded in the banks, with dynamic switching (at the pixel rate), each line being common to two modules (respectively modules 130 and 140 on the one hand, and 150 and 160 on the other hand),
- WE_POINT1 . . . 2 and WE_LINE1 . . . 2: disabling of the pointwise and linewise shifting, common to two modules (respectively modules 130 and 140 on the one hand, and 150 and 160 on the other hand),
- IN_VECTX and IN_VECTY: vector inputs for the random access application, IN_DOWNLOADING: downloading bus for the configuration including the positioning of the multiplexers and the coefficients of the sixteen cells.

Moreover, the network 120 comprises at output (FIG. 4) four buses OUT1 . . . OUT4 each of 10 bits. The latter correspond to a multiplexing and to a formatting whose configuration depends on the requirements of the application. Thus, in all the configurations, there cannot be more than 40 output bits. The four buses OUT1 . . . OUT4 are linked to the outputs OUT_VIDEO1 . . . OUT_VIDEO4, OUT_CALC1 . . . OUT_CALC4, OUT_CALC 12, OUT_CALC34 and OUT_CASCAD by multiplexers 200 (inputs OUT_VIDEO1 and OUT_VIDEO2), 201 (inputs OUT_CALC2 and OUT_CALC12), 202 (inputs OUT_CALC3 and OUT_CALC34), 203 (inputs OUT_VIDEO3 and OUT_VIDEO4), 204 (inputs: output of the multiplexer 200 and OUT_CALC1), 205 (inputs: outputs of the multiplexers 202 and 203), 206 (inputs: outputs of the multiplexers 201 and 204), 207 (inputs: output of the multiplexer 205 and OUT_CALC4), 208 (inputs: output of the multiplexer 206 and OUT_CASCAD), 209 (inputs: output of the multiplexer 201 and OUT_CASCAD) and 210 (inputs OUT_CALC4 and OUT_CASCAD). Moreover, shifting and rounding units 211-215 respectively followed by registers 216–220 are respectively interposed between the calculation outputs (OUT_CALC1, output of the multiplexer 201, OUT_CASCAD, OUT_CALC4, output of the multiplexer 202) and the corresponding inputs of the multiplexers 204–210.

In the examples of use hereinbelow, to each filter configuration there corresponds a programming dedicated to formatting and to multiplexing. For example, for a cascaded use, the output delivers the 30-bit signal OUT_CASCAD accompanied by a delayed 10-bit source video signal (OUT_VIDEO3 or 4), these two signals joined leading to a 40-bit word.

For the use of the network 120 as a temporal filter, frame memories organized as a FIFO are employed in the construction of the filter. According to an advantageous embodiment, these memories are integrated into the overall architecture. In another advantageous embodiment, they are regarded as external items inserted only as required.

The following examples of filters (Examples 1 to 3) are obtained on the basis of the network 120, configured and parameterized in particular ways by downloading.

EXAMPLE 1

Symmetric Horizontal-vertical Filter

The properties of such a filter, represented in FIG. 5 and referenced 120A, are as follows:
one input (IN_VIDEO1),
one output (OUT_VIDEO4),
5*5 coefficients with odd symmetry
 (C12,C13,C14,C13,C12,
  C9,C10,C11,C10,C9,
  C6,C7,C8,C7,C6
  C3,C4,C5,C4,C3
  C0,C1,C2,C1,C0)
sum of the coefficients 1024,
800 points by 600 lines,
active rounding and clipping.

Figure 5:
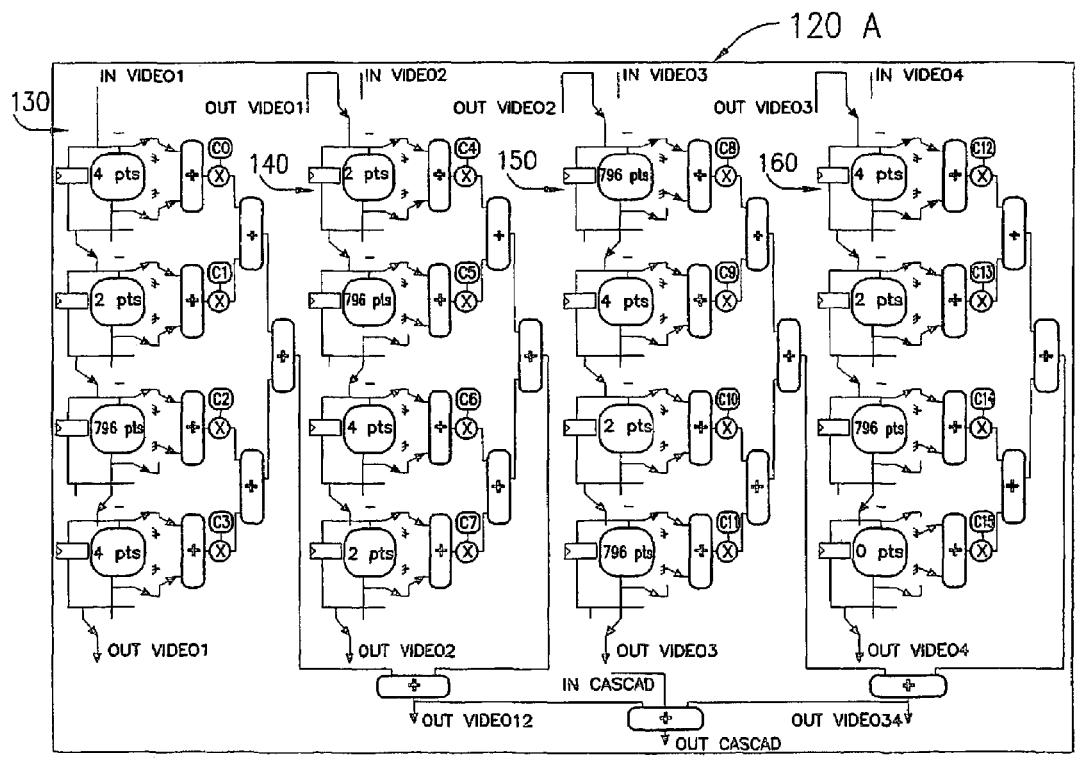
FIG. 5 shows diagrammatically in schematic form a first exemplary configuration of the element of FIG. 4, for a horizontal and vertical filter with horizontal symmetry.

The horizontal symmetries are taken into account by virtue of the delays applied to the LARs 5 of the cells 1 of the four modules 130, 140, 150 and 160 of the network 120 (a delay of n points in a LAR is indicated in FIG. 5 by the notation "n pts" in the LAR).

For each cell 1 used to exploit a horizontal symmetry, the adder 7 receives at the inputs 21 and 22 respectively the input and the output of the LAR 5, the latter producing a delay equal to the horizontal offset between two points having the same coefficients. For example, the first cell 1 of the module 130 has its LAR 5 which imposes a delay of four points and its bank 9 of coefficients which is associated with the coefficient C0. Moreover, the circulation output 3 receives the output from the register 16 (shifting of one point).

For each of the line jump cells 1 (coefficients C2, C5, C8, C11 and C14), the adder 7 receives at the input 21 the input 2 from the cell 1 and nothing at the input 22. The circulation output 3 for its part receives the output from the LAR 5, the latter producing a delay of positioning on the next line. For example, the third cell of the module 130 has its LAR 5 which imposes a delay of 798 points and its bank 9 of coefficients which is associated with the coefficient C2. As far as the last cell 1 is concerned (fourth cell of the module 160), its addition functions are deactivated, the inputs 21 and 22 of the adder 7 being set to zero.

EXAMPLE 2

Temporal Vertical Filter

Figure 6:
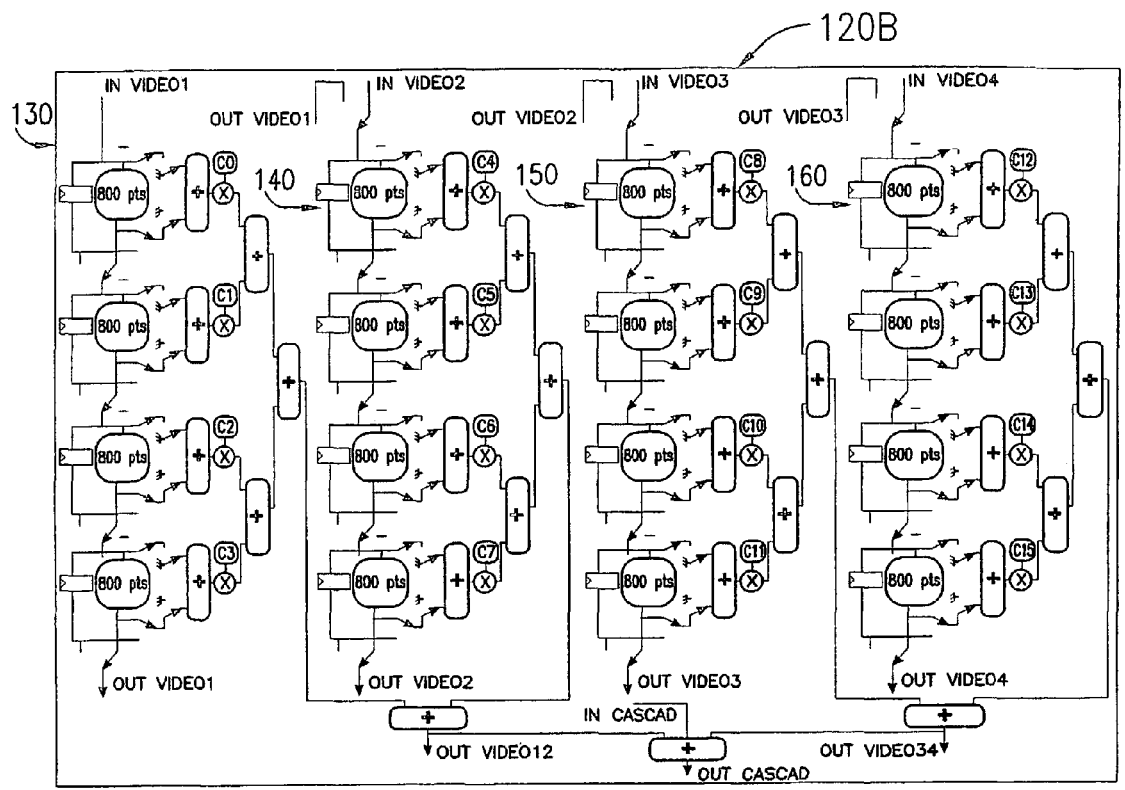
FIG. 6 diagrammatically shows in schematic form a second exemplary configuration of the element of FIG. 4, for a temporal vertical filter.

The properties of such a filter, represented in FIG. 6 and referenced 120B, are as follows:
four inputs IN_VIDEO1. . . IN_VIDEO4,
one output OUT_CASCAD,
4*4 coefficients (without particular symmetry)
 (C0,C1,C2,C3,
  C4,C5,C6,C7,
  C8,C9,C10,C11,
  C12,C13,C14,C15)
sum of the coefficients 1024,
800 points by 600 lines,
active rounding and clipping.

The adders of all the cells 1 receive at the inputs 22 the outputs from the LARs 5 and nothing at the inputs 21, the LARs 5 imposing delays of 800 points. Moreover, the circulation outputs 3 likewise receive the outputs from the LARs 5.

EXAMPLE 3

Horizontal Filter with Odd Symmetry

Figure 7:
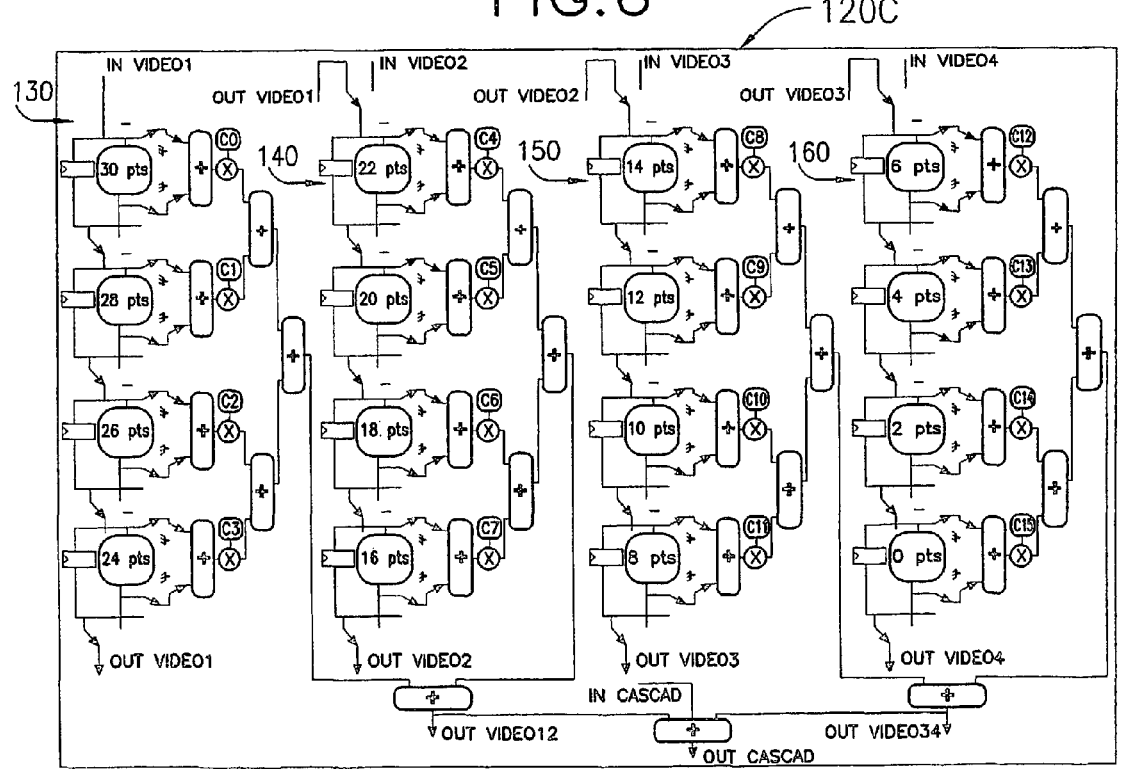
FIG. 7 diagrammatically shows in schematic form a third exemplary configuration of the element of FIG. 4, for a horizontal filter with odd symmetry.

The properties of such a filter, represented in FIG. 7 and referenced 120C, are as follows:
one input IN_VIDEO1,
one output OUT_CASCAD,
31 coefficients with odd symmetry (C0,C1 . . . ,C15, . . . C1,C0),
sum of the coefficients 1024,
800 points by 600 lines,
active rounding and clipping.

All the cells 1 are carriers of horizontal symmetries, except for the cell 1 associated with the central point (coefficient C15). Apart from the latter cell, the cells 1 therefore have their adders respectively receiving at the inputs 21 and at the outputs 22 the inputs and the outputs of the LARs 5, and their circulation outputs 3 receiving the outputs from the registers 16. These LARs 5 impose delays, the greatest of which is equal to 30 for the upstream cell 1

(of the module 130), and decreasing by two points on going from each cell to the next cell 1, down to the value of two points. The last cell 1 (of the module 160), associated with the coefficient C15, is not associated with any symmetry. Its adder 7 receives the input 21 the input 2 from the cell 1 and nothing at the input 22, and its circulation output 3 receives the output from the register 16.

In other embodiments of the network, the LAR 5 is capable of producing delays of several lines. The network thus obtained can serve to take into account vertical symmetries, with a vertical amplitude of processing of the symmetries corresponding to the number of lines of this LAR. The latter is therefore advantageously capable of generating a delay (at least) equal to the total number of lines of the image. In a variant embodiment, the capacity of the LAR is less than the total number of lines of an image, and is adapted to the maximum height of the filters used in practice in the intended applications.

Preferably, in the embodiments in which the LAR 5 is capable of producing delays of several lines, the register 16 is replaced with a delay line, advantageously having a capacity of at least one line. The performance of the filter in respect of going from one line to another may thus be improved.

EXAMPLE 4

Image Format Expansion Filter

Figure 2:
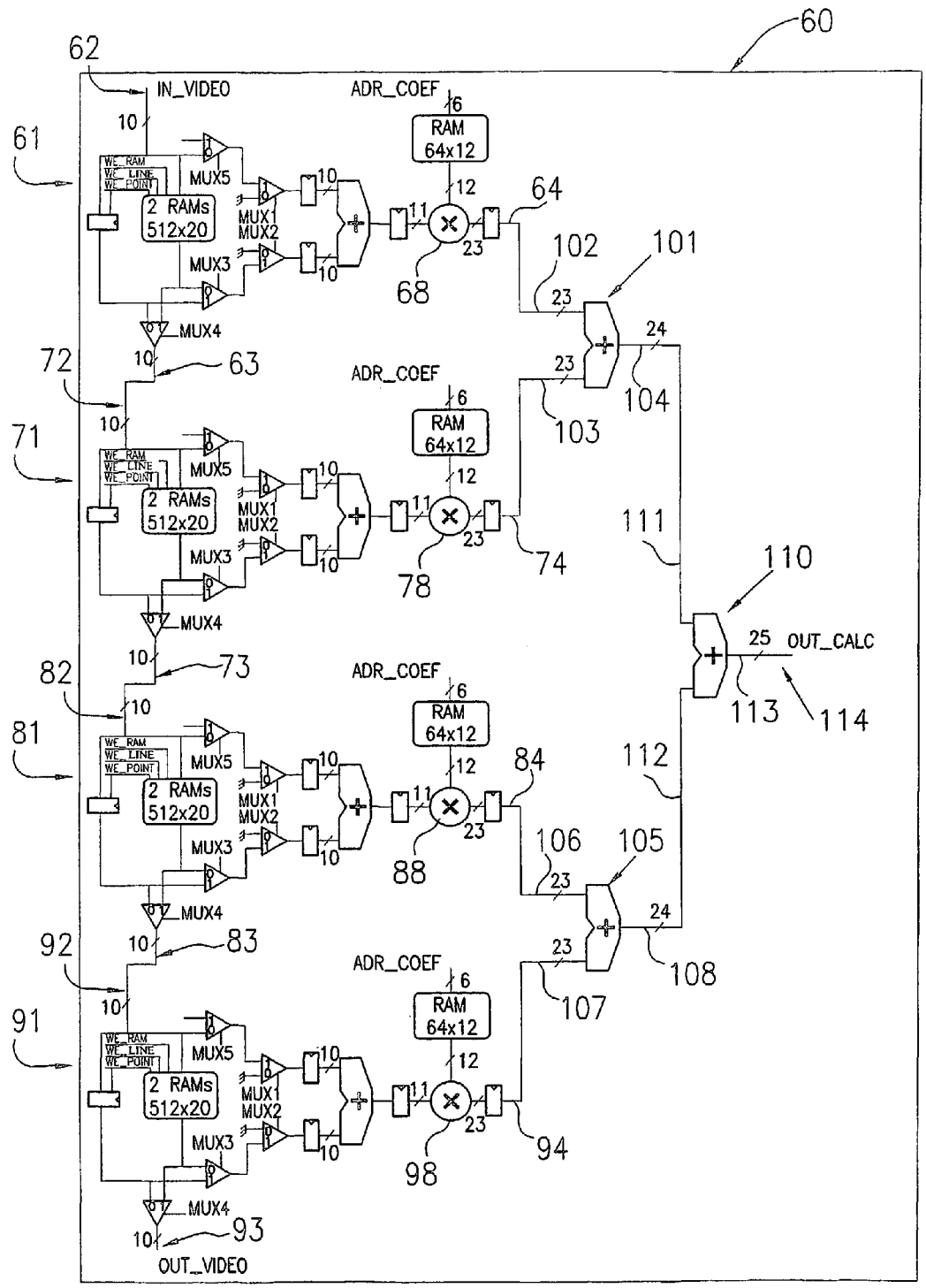
FIG. 2 shows a basic module formed from four cells such as that of FIG. 1.
Figure 3:
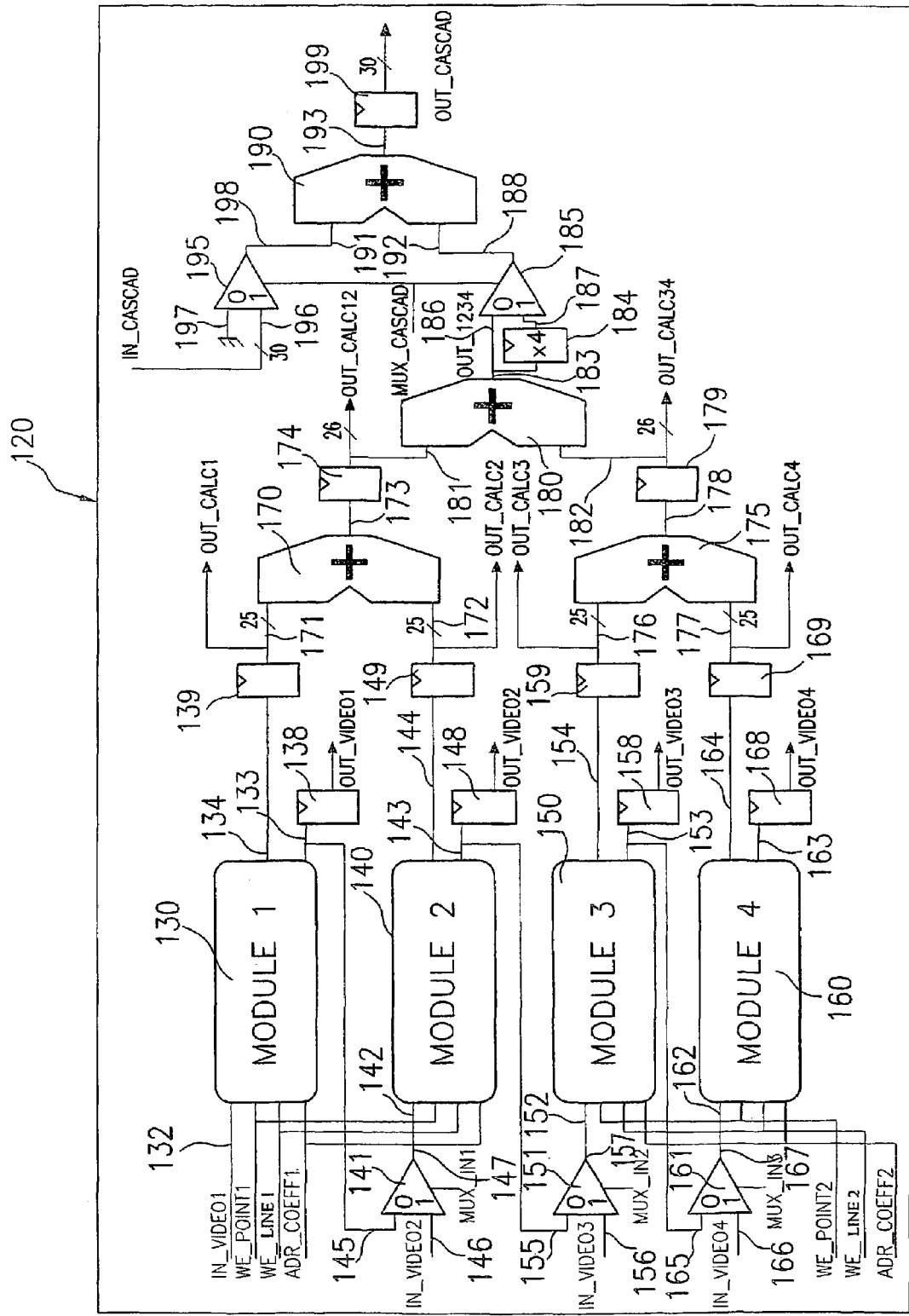
FIG. 3 shows a final network employed in an element, formed from four modules such as that of FIG. 2.
Figure 8:
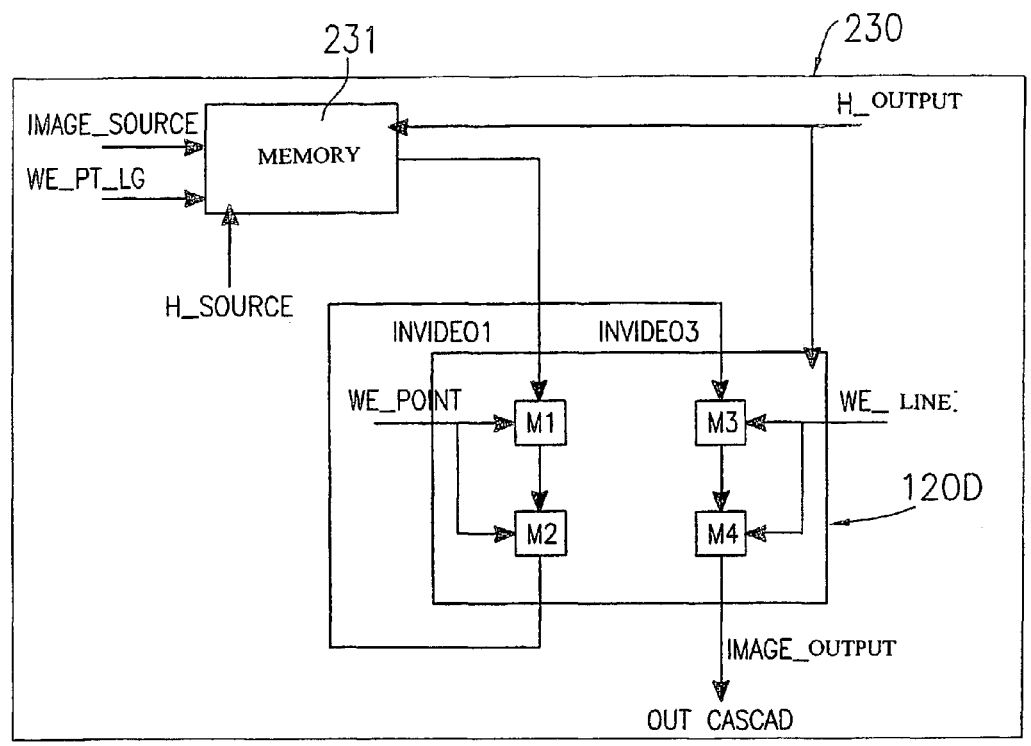
FIG. 8 shows a configuration of the element of FIG. 4 for a horizontal and vertical expansion.

Such a filter 230, represented in FIG. 8, implements the disabling functions on the basis of an architecture based on modules M1–M4 identical to that 60 of FIG. 2, arranged as a network 120D.

The filter 230 comprises:
the four modules M1 to M4 each of four coefficients, the modules M1 and M2 being intended for horizontal interpolation and the modules M3 and M4 for vertical interpolation;
a head memory 231 for rate conversion, arranged upstream of the modules M1–M4,
two clock inputs H_SOURCE and H_OUTPUT in the head memory 231, which are designed to give respectively the rates of the source image and of the output image,
point disabling lines WE_POINT linked to the modules M1 and M2 and line disabling lines WE_LINE linked to the modules M3 and M4.

The output OUTVIDEO2 of the module M2, corresponding to the horizontal interpolation, is connected to the input INVIDEO3 of the module M3, which leads to a vertical interpolation.

The separation of the point and line disabling signals per group of two modules makes it possible to carry out in one and the same element a horizontal expansion and a vertical expansion in a single processing pass. The head memory 231 makes it possible to generate a change of pixel rate or pixel clock, which corresponds to that resulting from a change of image format. Writing to this memory 231 is carried out at the rate of the source image (given by H_SOURCE), whilst reading from this memory is carried out at the rate of the output image (given by H_OUTPUT). In this way, only the pixels which are useful for the filtering operation are stored.

In a particular implementation, a zoom centred on the middle of the image is performed. The expansion factor in each direction is 2 and the interpolator filter 230 uses eight coefficients in each direction.

For the horizontal interpolation, effected in the modules M1 and M2, a point disabling is performed every pixel entering the filter 230 or every two pixels exiting the filter 230. Reading of the head memory 231 and also pixel shifting in the filter 230 are then frozen by the signal WE_POINT. Twice as many pixels are thus obtained at the output of the modules M1 and M2 as at the input.

For the vertical interpolation, the procedure is similar, but with a freezing by the signal WE_LINE of the line shifting, for each new incoming line or every second line exiting the modules M3 and M4. The vertical-wise rate conversion is also carried out by the head memory 231, this involving the repeating of the horizontal interpolation for each line disabled. The line disabling is in fact performed in the head memory 231 on the pixels of the source image.

In a particular application of image format conversion, the conversion is from a TV signal to a HD TV signal. The TV image is then stored in the head memory 231 at the TV clock rate and it is read back at the HD TV rate to carry out horizontal and vertical expansions.

EXAMPLE 5

Undersampling (Compression) Filter

Figure 9:
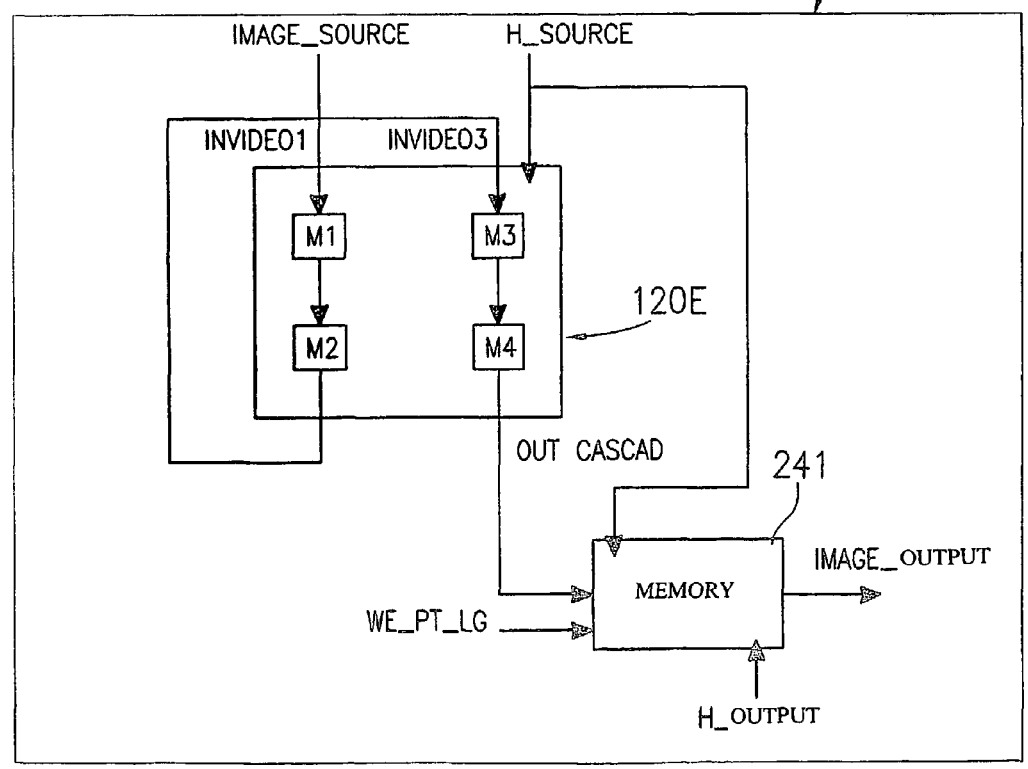
FIG. 9 shows a configuration of the element of FIG. 4 for a horizontal and vertical compression (undersampling)

Such a compression filter 240, represented in FIG. 9, is also obtained through an architecture based on modules M1–M4 identical to that 60 of FIG. 2, but comprises an output memory 241 having a rate conversion function.

This memory 241 is furnished with a point and line disabling input WE_PT_LG, which allows a selection of the useful points and lines. It also comprises the clock inputs H_SOURCE and H_OUTPUT, respectively giving the rates of writing (information originating from the modules) and of reading (reduced output image) for this memory 241.

The functions of the modules M1 to M4 are similar to those set forth in Example 4 in respect of expansion.

This undersampling filter 240 makes it possible to reduce the size of the image in terms of number of points and lines, this operation being accompanied by filtering which makes it possible to comply with Shannon's law.

The filter 240 operates at the rate of the source image and it carries out more interpolations than necessary, since it provides a pixel at its output for each input pixel and a line for each input line. The output memory 241 performs selection of the useful points and lines (input signal $WE_{PT}\_LG$) and is subsequently read at the rate of the reduced output image.

The ensuing part of the description is devoted to the random access functions, which may be implemented instead of a linear filtering on the basis of elements similar to those set forth earlier, by virtue of straightforward adaptations.

A particularly beneficial application of random access is motion compensation. In a corresponding operation of pixel access, illustrated in FIG. 10, the current address is carried by a frame T undergoing interpolation, situated between two frames, preceding T1 and following T2 (bidirectional random access). The interpolation of a point M of the current frame T calls upon the pixels of the two adjacent frames T1 and T2, which are situated in the immediate vicinity of the points of impact of an interpolation vector V. The point M is calculated by weighting the values of the two points of impact as a function of a coefficient $\alpha$ (lying between 0 for T placed in T1 and 1 for T placed in T2) giving the relative position of the frame T with respect to T1 and T2. The points of impact are themselves calculated by interpolation from the pixels of their environments. In the examples set forth, a bilinear interpolation is performed using only the four pixels A1, B1, C1 and D1 for T1 and A2, B2, C2 and D2 for T2 respectively flanking each of the points of impact M1 and M2. Moreover, an accuracy of interpolation of as much as a quarter of a pixel is defined, using an accuracy of the addresses of impact to a quarter of a pixel. This leads to the distinguishing of a fractional part of these addresses, which is represented by a fractional part of two bits. This fractional part determines the coefficients of the interpolation carried out on the basis of the four pixels flanking the impact of the vector V, respectively in the frames T1 and T2.

The succession of operations performed is as follows:
Calculation of the addresses of impact A1 and A2 respectively in the frames T1 and T2 as a function of a vector V referenced from T2 to T1:

$$V1(x,y)=\alpha*V(x,y)$$

$$V2(x,y)=(1-\alpha)*V(x,y);$$

the quadruples are then tagged by the addresses of the pixels A1 and A2:

$$A1(x,y)=M(x,y)+\text{Ent}[V1(x,y)]$$

$$A2(x,y)=M(x,y)+\text{Ent}[V2(x,y)]$$

where Ent corresponds to the extraction of the integer part;
Interpolation of the points of impact M1 and M2

$$M1=A1*(1-Fr[V1(x)])*(1-Fr[V1(y)])+B1*Fr[V1(x)]\\*(1-Fr[V1(y)])+C1*(1-Fr[V1(x)])*Fr[V1(y)]+\\D1*Fr[V1(x)]*Fr[V1(y)]$$

$$M2=A2*(1-Fr[V1(x)])*(1-Fr[V1(y)])+B2*Fr[V1(x)]\\*(1-Fr[V1(y)])+C2*(1-Fr[V1(x)])*Fr[V1(y)]+\\D2*Fr[V1(x)]*Fr[V1(y)]$$

where Fr represents the extraction of the fractional part of a component of the vector;
Interpolation of the point M:

$$M=(1-\alpha)*M1+\alpha*M2.$$

Figure 11:
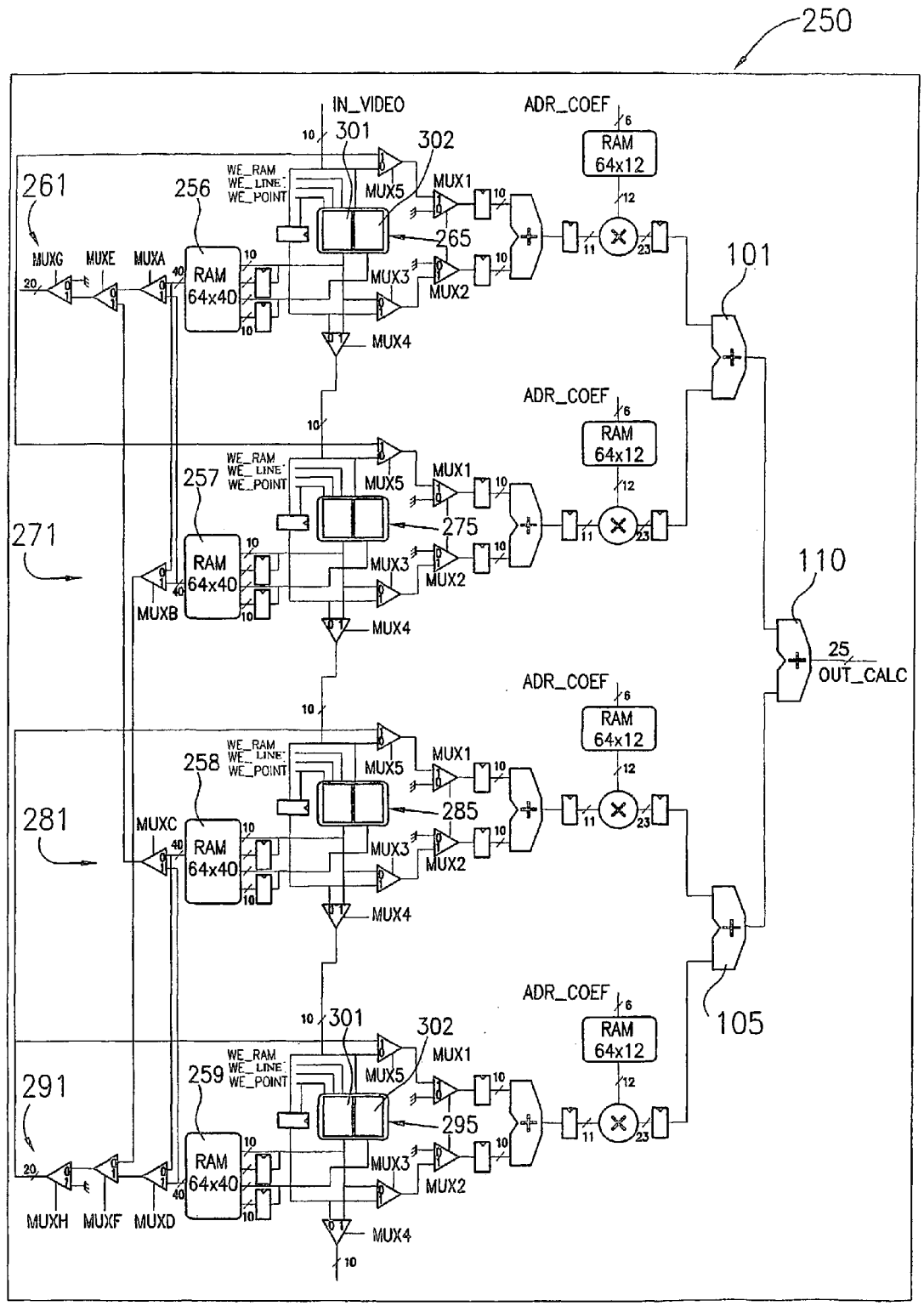
FIG. 11 represents a basic module supplemented with respect to that of FIG. 2, so as to permit random access for motion compensation.
Figure 12:
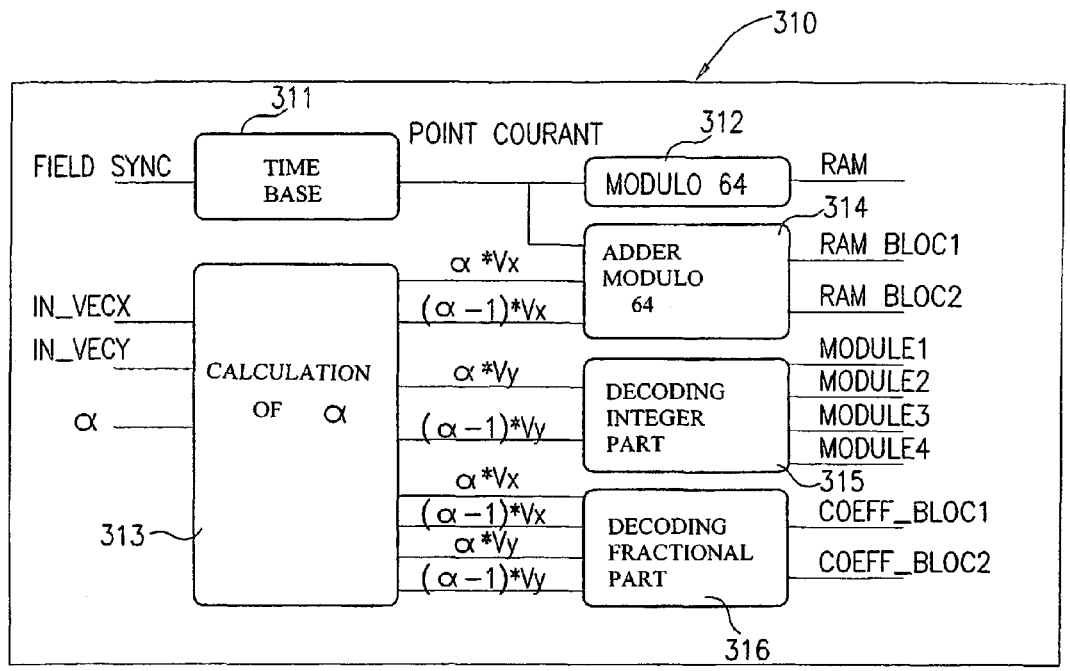
FIG. 12 is a block diagram showing the address generation device used in an element for random access based on four modules such as that of FIG. 11.
Figure 13:
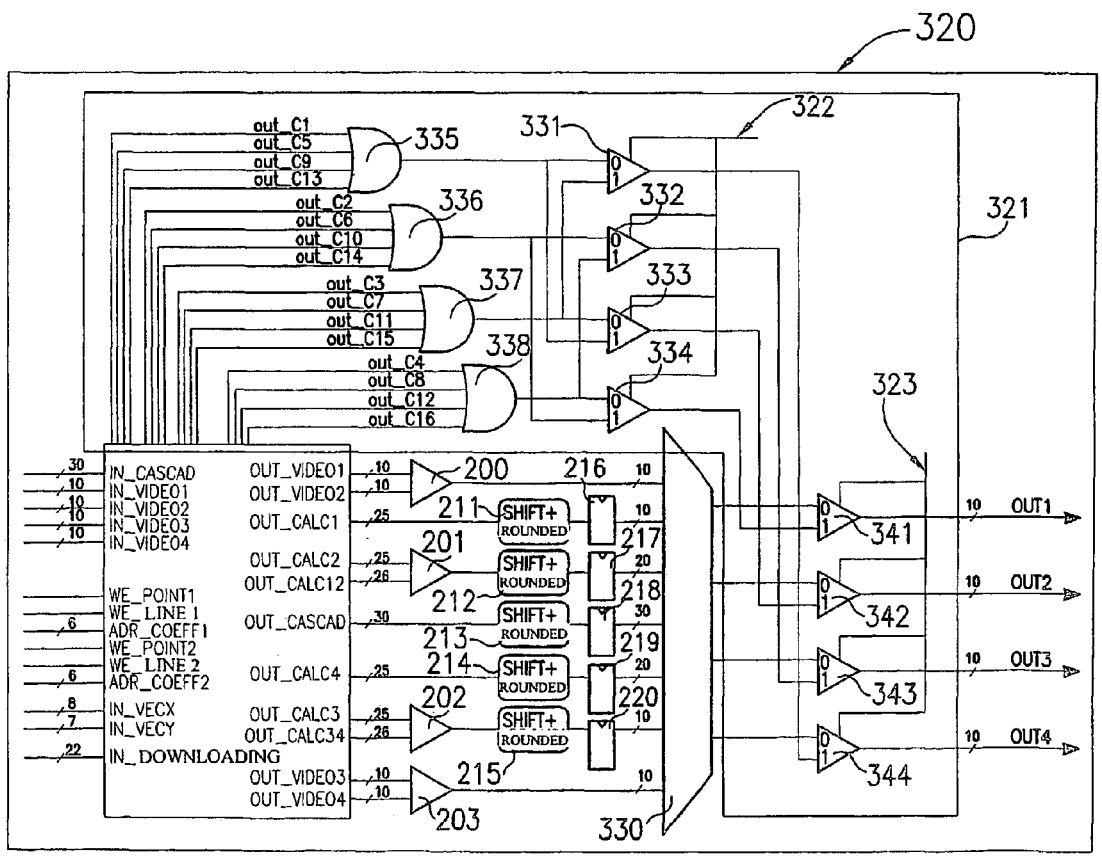
FIG. 13 illustrates the items for pixel access without interpolation in an element for random access based on four modules such as that of FIG. 11.

An element, represented in FIGS. 11 to 13, used for these operations relies on the use of four modules 250 similar to that 60 of FIG. 2. The modules 250 (FIG. 11) each comprise four cells 261, 271, 281 and 291 and are modified as follows:
separation of each line memory (delay lines 265, 275, 285 and 295 respectively of the cells 261, 271, 281 and 291) of 2048 pixels into two RAM memories 301 and 302 of 1024 pixels each (a delay RAM a line 4 at 1028) leading to a total of 32 lines,
association of 64-word access RAMs 256–259 (64×40 dual port RAMs) respectively with the delay lines 265, 275, 285 and 295 of the cells 261, 271, 281 and 291.

These supplements make it possible to yield a RAM depth equal to the maximum excursion of the vector in terms of X and Y, which is required for the introduction of the random function. These maximum excursions of the vector are generally fixed at ±31 points and ±15 lines for most systems with motion compensation. They therefore necessitate the availability of a memory space with a depth of 64 points on 32 lines.

These access RAMS 256–259, of smaller capacity than the delay lines 265, 275, 285 and 295 and arranged in parallel with these lines, make it possible to remedy the access time limitation problems which would arise through the exclusive use of the RAMs of the delay lines 265, 275, 285 and 295. They are used only for random access. To support the maximum X size of the vector, 64-point RAMs are required. However, recourse is advantageously had to a duplication of the access RAM, since it is thus possible to access two consecutive points of the same line in a clock cycle, these points being written at the same address. Hence, access RAMs of 64*20 words per line are used. The basic cells 261, 271, 281 and 291 possess two lines of 1024 pixels, and it is necessary to associate two RAMs of 64*20 therewith, which can be manifested by a 64*40 RAM.

The module 250 is therefore enhanced with the RAMs 256–259 of 64 words of 40 bits and with new multiplexers dedicated to the random access function (FIG. 11):
MUXA and MUXB, which each have two outputs respectively connected to the access RAMs 256 and 257,
MUXC and MUXD, which each have two outputs respectively connected to the access RAMs 258 and 259,
MUXE, which has two outputs respectively connected to the inputs of the multiplexers MUXA and MUXC,
MUXF, which has two outputs respectively connected to the inputs of the multiplexers MUXB and MUXD,
MUXG, which has an output connected to the input of MUXE and another at zero,
and MUXH, which has an output connected to the input of MUXF and another at zero.

Writing to the access RAM 256–259 is done in pipeline mode at the clock frequency of the input video. With each write, the value written 64 clock ticks earlier is overwritten. At readout level, to obtain a square grid as required, we calculate the address pointed at by the vector which serves to select the pair of pixels along the X axis and the pair of lines along the Y axis.

In another embodiment for random access, the pixels acquisition function forms an integral part of the LARs delay memories 265, 275, 285 and 295. The latter permit in this case read/write times which are sufficiently small as to allow the total number of read/write accesses required both for the delay function and for the random access function. The overall principle does not change, the outputs of the LARs 265, 275, 285 and 295 being redirected respectively to the multiplexers MUX5, which gather the random access data.

Figure 10:
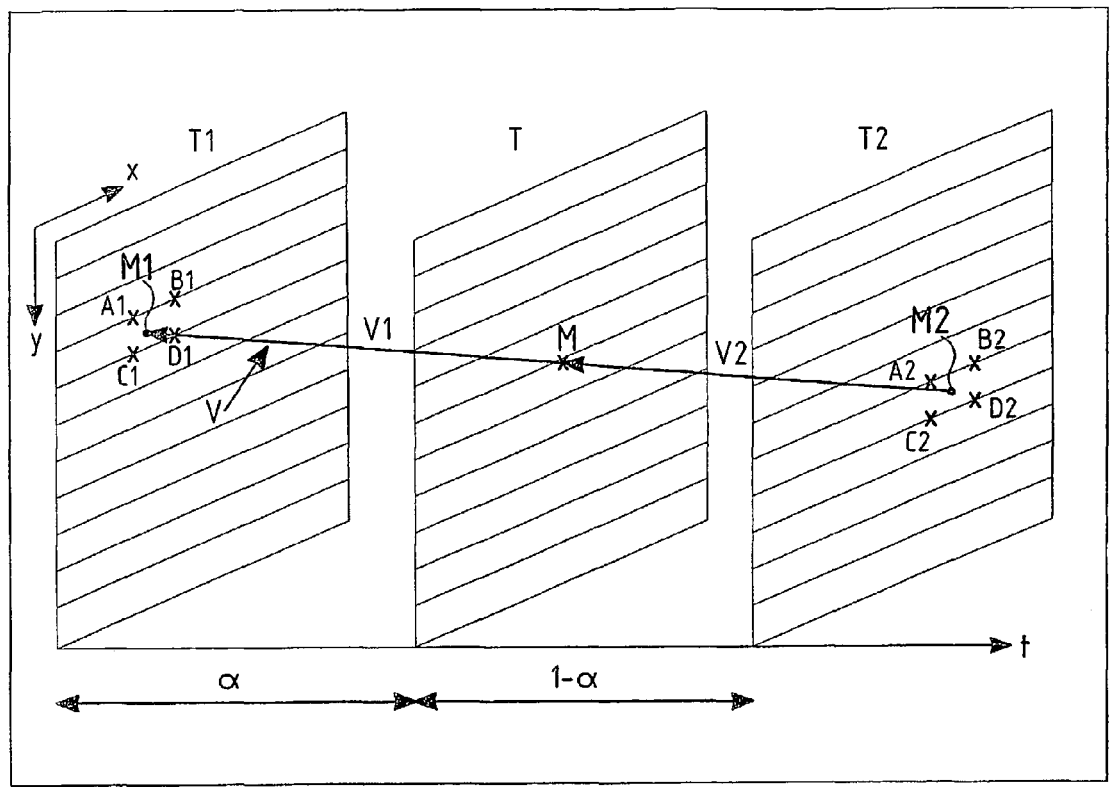
FIG. 10 illustrates a bilinear interpolation in a frame T from two frames T1 and T2 flanking it.

The modules 250 are advantageously devised in such a way as to carry out two types of access:
bidirectional access, as illustrated by FIG. 10, in which two modules 250 are assigned to each frame T1 and T2; these two modules then make up a block: BLOC1 for frame T1 and BLOC2 for frame T2; the vertical excursion of the vector is in this case limited to ±7 lines; according to an advantageous embodiment, this excursion is extended by cascading several networks;
monodirectional access, which consists in accessing a single frame to which all the lines are allotted; the vertical excursion of the vector is then a maximum and equal to ±15 lines for a single network.

The network is therefore still structured as modules as in the case of filtering, each module 250 taking on board either the whole of the bilinear interpolation when the quadruple of pixels emanates entirely from its RAMs, or half of the interpolation when only half of the pixels originate from its RAMs.

The interpolation with random access ultimately comprises two steps: the selecting of the quadruple of pixels and bilinear interpolation.

The first step, selecting of the quadruple, is performed by virtue of an assembly for generation of addresses 310 of the relevant network 320 (FIG. 12). This assembly 310 comprises:

a timebase unit 311, receiving a FIELD_SYNC synchronization signal and producing information on a current point, a write unit 312 modulo 64, receiving the information regarding current point of the timebase unit 311 and writing write data modulo 64 to the RAMs of the cells, a calculation unit 313, receiving the components Vx and Vy of the vector V and the coefficient α respectively via the lines IN_VECX, IN_VECY and ALPHA and generating products of the components Vx and Vy times the factors α or (α−1), an adder 314 modulo 64, receiving the information regarding current point of the timebase unit 311 and the products α.Vx and (α−1).Vx from the calculation unit 313, and generating addressing data for the RAMs contained in the blocks BLOC1 and BLOC2 respectively via two lines RAM_BLOC1 and RAM_BLOC2, an integer part decoding unit 315, receiving the products α.Vy and (α−1).Vy from the calculation unit 313, and generating addressing data for the multiplexers MUXA to MUXH of the four modules of the network, respectively via four lines MODULE1–MODULE4, and a fractional part decoding unit 316, receiving the products α.Vx, α.Vy, (α−1).Vx and (α−1).Vy from the calculation unit 313, and generating coefficients intended for the banks 9 of the blocks BLOC1 and BLOC2, respectively via two lines COEFF_BLOC1 and COEFF_BLOC2.

The step of selection of the quadruple entails:

a selection along the X axis, which is performed by addressing the 64-word access RAMs 256–259 (via the adder 314); for this addressing, all the modules 250 and the cells assigned to one and the same frame are addressed identically; and a selection along the Y axis, which is performed with the aid of the multiplexers MUXA to MUXH of each module 250 (via the integer part decoding unit 315); if the lines stored in one of the modules 250 does not contain any pixel of the quadruple, then the multiplexers MUXG and MUXH direct a zero value to the multipliers 8; if they contain only two pixels of the quadruple, then just one of the two multiplexers MUXG and MUXH is validated; this signifies that the states of the multiplexers MUXA to MUXF may be common to all the modules 250, whilst those of the multiplexers MUXG and MUXH must be dedicated to the modules 250.

The second step, the bilinear interpolation, is carried out by means of the multipliers 8 associated with the banks 9 of coefficients. The coefficient addressed to each multiplier 8 (by the fractional part decoding unit 316) corresponds to the contribution which the pixel should have in the bilinear interpolation operation. The addressing of the bank 9 of coefficients is therefore calculated on the basis of the fractional parts of the addresses of impact in T1 and T2, as well as the contributions α and (0α−1).

The network formed from the modules 250 corresponds for example to the network 120 (FIGS. 3 and 4) used in linear filtering.

The configuration described hereinabove applies to the most common cases of using the architecture in random access mode, which calls upon bilinear interpolation.

A particular network embodiment, referenced 320 and represented in FIG. 13, applies also to less usual cases, which require more sophisticated interpolations and manipulations of pixels, which cannot be anticipated and provided for in a basic version of the architecture described earlier. This embodiment makes it possible for the four pixels flanking the point of impact to be output simply without further processing. This manner of operation applies to single-frame access employing 32 lines vertically, the four pixels then being delivered respectively on the four outputs OUT1 . . . OUT4.

The network embodiment 320 makes it possible to preserve in tact the architecture described earlier (based on that of the network 120 used in linear filtering), while supplementing it by means of an assembly 321 of additional items for pixel access. The assembly 321 comprises multiplexers arranged in parallel with this architecture, permitting the implementation of this functionality. To aid the reading of FIG. 13, the series of multiplexers 204 to 210 of the network 320 is brought together in an output block 330. The assembly 321 comprises three levels of multiplexing:

a first multiplexing level comprising four OR gates 335–338 each having four inputs, respectively receiving truncated calculation outputs OUT_C1 . . . 16 consisting of the 10 least significant bits of the calculation outputs 4 from the sixteen cells of the network 320; the four inputs of each of the OR gates 335–338 respectively receive one of the truncated outputs OUT_C1 . . . 16 from the four modules 250 of the network 320, the OR gates 335–338 respectively receiving the outputs from the first (261), the second (271), the third (281) and the fourth (291) cells of each of the four modules 250, a second multiplexing level comprising four multiplexers 331–334 for reordering the pixels in a desired order, controlled by a command 322 determined by the least significant bit of the integer part of the component Y of the address of the point of impact M1 or M2, these multiplexers 331–334 having as respective inputs the outputs of the gates 335 and 337, 336 and 338, 335 and 337, and 336 and 338, a third multiplexing level comprising four multiplexers 341–344 for output selection, controlled by an output selection command 323, each having as first input an output of the output block 330 corresponding to an interpolated output mode, having as second inputs respectively the outputs of the multiplexers 334, 333, 332 and 331, corresponding to a four pixel output mode, and having as outputs respectively output lines OUT1–OUT4 on 10 bits each.

In the mode of operation for extracting the pixels flanking the point of impact (four pixel output mode), the basic cells 261, 271, 281, 291 . . . operate in a similar manner to the interpolated output mode, but the multipliers 8 are positioned transparently by the selecting of a coefficient equal to unity in all the banks 9 of coefficients. The OR gates 335–338 then direct via the OR logic function the appropriate outputs from the cells to the four outputs OUT1 . . . OUT4 of the overall network 320. The reordering is for its part performed by the multiplexers 331–334 according to the parity of the Y component of the address of impact.

Figure 14:
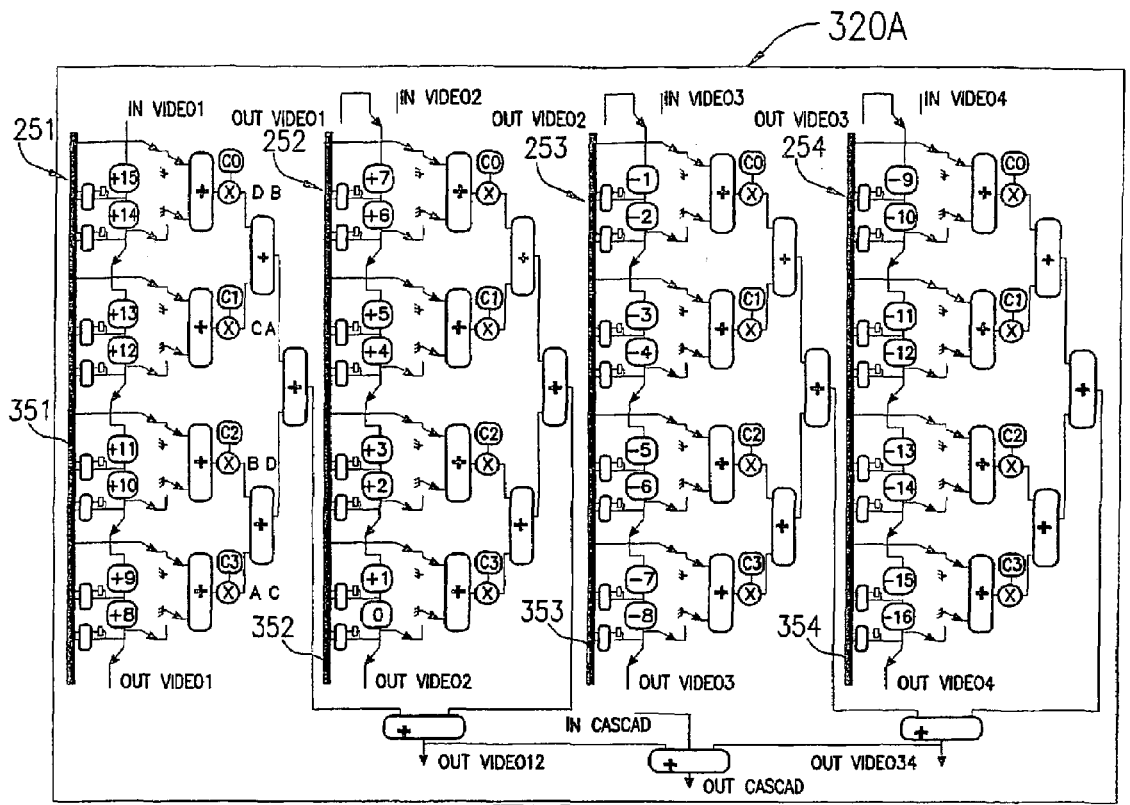
FIG. 14 diagrammatically shows in schematic form a first exemplary configuration of the element of FIGS. 12 and 13, for random access to a single video input (random access on 32 lines)
Figure 15:
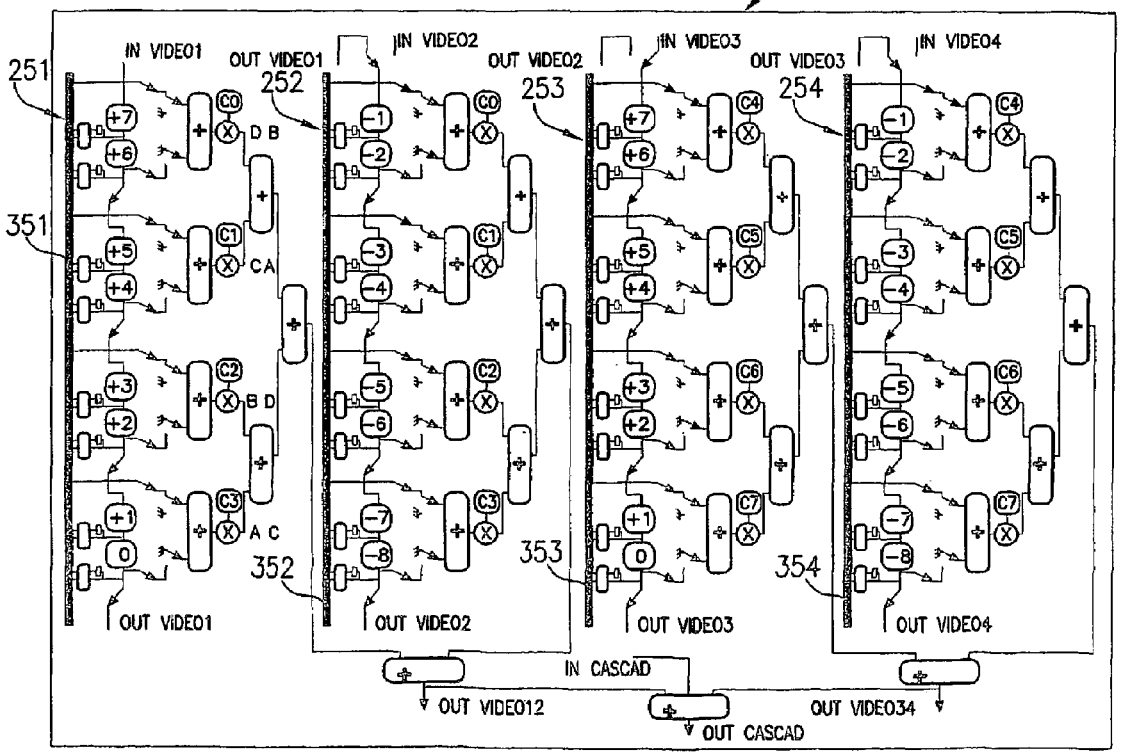
FIG. 15 diagrammatically shows in schematic form a second exemplary configuration of the element of FIGS. 12 and 13, for random access to two video inputs (dual random access on 16 lines)

Examples of application of random access are given hereinbelow (with reference to FIGS. 14 to 16). They are obtained on the basis of particular configurations of the network 320, whose four modules are referenced 251–254 respectively, and whose addressing multiplexers MUXA-MUXH are represented in the form of multiplexing bars, referenced 351–354 respectively for the modules 251–254. FIGS. 14 and 15 show the various paths taken by the data in interpolated output mode and FIG. 16 those taken in four pixel output mode. In all cases presented, the first inputs 21 of the adders 7 are connected to the outputs of the multiplexers MUXG (first and second cells) and MUXH (third and fourth cells) of the modules 250 to which they respectively belong, via the multiplexers MUX5 of their cells 1, and their second inputs 22 are set to zero.

The grid considered comprises four points A, B, C and D, distributed in the following manner:

| | |
|---|---|
| A | B |
| C | D |

Figure 16:
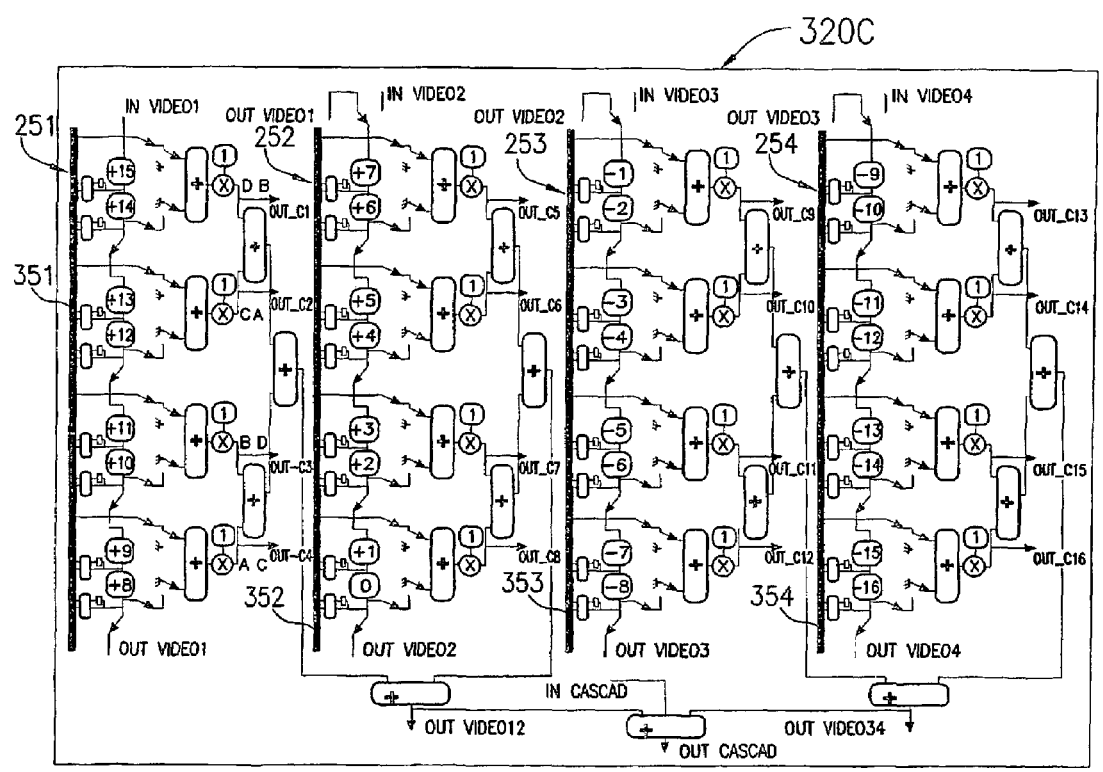
FIG. 16 diagrammatically shows in schematic form a third exemplary configuration of the element of FIGS. 12 and 13, for random access to four pixels without interpolation.

Indicated in FIGS. 14 to 16 are the pixels obtained respectively at the outputs of the cells of the first module 351. The letter on the left corresponds to an even value of the Y component of the address and that on the right to an odd value. The output pixels from the four cells of the module 351 are thus respectively D, C, B and A for Y even, and B, A, D and C for Y odd. The reordering, vertical only, is performed in interpolated output mode by appropriate selection of the coefficients in the bank 9, and in four pixel output mode, by the multiplexers 331–334.

The interpolated output mode can be programmed according to two forms of implementation: a first form with a single video input and a vector which can range from + or − 15 lines, and a second form with two video inputs and a vector with excursion of + or − 7 lines. These two situations are respectively illustrated in Examples 6 and 7 hereinbelow.

EXAMPLE 6

Random Access on 32 Lines

The network configuration 320 of the present example referenced 320A and represented in FIG. 14, involves a single video input IN_VIDEO1 and a calculation output OUT_CASCAD. The coefficients C0, C1, C2 and C3 are common to the four modules 251–254.

An analysis is performed on the two terms $\alpha.Vx$ and $\alpha.Vy$. The address of the coefficients C0, C1, C2 and C3 is dependent on the fractional part of the values $\alpha.Vx$ and $\alpha.Vy$ and the positionings of the multiplexers MUXA–MUXH depend on the integer part of the value $\alpha.Vy$. For a value of $\alpha.Vy=-12.5$, for example, lines −13 and −12 are accessed.

EXAMPLE 7

Dual Random Access on 16 Lines

In this example, the network configuration 320, referenced 320B and represented in FIG. 15, relies on the use of two video inputs IN_VIDEO1 (input of the module 251) and IN_VIDEO3 (input of the module 253) and of the calculation output OUT_CASCAD. The terms $\alpha.Vy$, $\alpha.Vx$, $(\alpha-1).Vx$ and $(\alpha-1).Vy$ are calculated at the level of the element (such as an ASIC). Specifically, when two accesses are requested, they are both dependent on the same vector but in opposite directions. An analysis is thus performed on the four terms above, this requiring dual decoding. Example:

$\alpha=0.3, Vx=25, Vy=-5$ $\alpha.Vy=-1.5, \alpha.Vx=7.5, (\alpha-1).Vx=-17.5$ and $(\alpha-1).Vy=3.5$.

At the level of the coefficients of the multipliers 8, two cases are possible according to the application. In a first form of implementation, two bilinear interpolations are carried out and the two results are kept. In this case, the banks 9 of coefficients C0–C3 and C4–C7 are downloaded with the same values. In a second form of implementation, a temporal interpolation is carried out between the two bilinear interpolations. To do this, a correction term is applied to the coefficients C0–C7 according to the phase to be calculated.

EXAMPLE 8

Random Access with 4 Pixels without Interpolation

In such an embodiment, the network configuration 320, referenced 320C and represented in FIG. 16, makes it possible to retrieve at output the four points of the 2*2 grid pointed at by the vector. The element comprises 40 output pins, which make this extraction of information possible. During operation, a coefficient equal to 1 is applied in all the banks 9 of coefficients and the points A, B, C and D are routed at output by means of the truncated outputs OUT_C1-OUT_C16 respectively arranged on the ten least significant bits of the calculation outputs 4, to the OR gates 335–338 of the assembly 321. The reordering of the relevant grid is managed as a function of the parity of the Y component of the address of the point of impact, by means of the multiplexers 331–334.

What is claimed is:

1. Elementary cell of a linear filter for image processing, comprising:
   an input, intended to sequentially receive data relating to pixels of an image to be processed,
   a circulation output, intended to sequentially transmit the said data with a delay,
   a calculation output intended to sequentially transmit results obtained by a processing of the said data in said elementary cell,
   a main delay line having an input capable of being linked to the input of said elementary cell and an output capable of being linked to the circulation output and to the calculation output of said elementary cell,
   a coefficients memory, provided so as to contain at least one multiplier coefficient, and
   a multiplier connected to the coefficients memory, having an input and an output which are capable of being linked respectively to the output of the main delay line and to the calculation output of said elementary cell, the said multiplier being intended to perform multiplications on the said data received at the input of the said multiplier by at least one of the said multiplier coefficients of the coefficients memory and to transmit via the output of the said multiplier the result obtained, wherein
   the main delay line is capable of producing a maximum shift corresponding to at least two pixels of the image to be processed and in that said elementary cell also comprises:
   an auxiliary delay line having an input and an output which are capable of being linked respectively to the input of said elementary cell and to the circulation output of said elementary cell,
   an adder having a first and a second input which are capable of being linked respectively to the input of said elementary cell and to the output of the main delay line, and an output capable of being linked to the multiplier,
   delay line selection means having a first and a second state, the said means being intended to link the input of said elementary cell to the circulation output of said elementary cell by way of the main delay line in the first state and by way of the auxiliary delay line in the second state, and calculation selection means having at least two states, the said means being intended to link the input of said elementary cell and/or the output of the said main delay line to the corresponding inputs of the adder, in the said states respectively.

2. An elementary cell according to claim 1, wherein the main and auxiliary delay lines are respectively capable of producing maximum shifts of at least one line and one point, the auxiliary delay line preferably comprising a register.

3. An elementary cell according to claim 1, wherein the main and auxiliary delay lines are respectively capable of producing maximum shifts of at least two lines and at least one line.

4. An elementary cell according to claim 1, wherein the coefficients memory consists of a memory intended for storing a bank of coefficients and in that said elementary cell comprises means for selecting one of the said coefficients.

5. An elementary cell according to claim 1, wherein the said elementary cell comprises shift disabling means for at least one of the said delay lines.

6. An elementary cell according to claim 1, wherein the said calculation selection means comprise:
  a first multiplexer having a first input linked to the input of said elementary cell, a second input linked to the zero and an output linked to the first input of the adder corresponding to the input of said elementary cell, and
  a second multiplexer having a first input linked to the output of the main delay line, a second input linked to the zero and an output linked to the second input of the adder corresponding to the output of the main delay line.

7. An elementary cell according to claim 1, wherein said elementary cell comprises at least one control line intended for downloading control information to at least one item of said elementary cell, the said control lines being chosen from:
  at least one line for addressing multiplier coefficients intended for the said coefficients memory,
  at least one line for addressing parameters for selecting coefficients, intended for the said coefficients memory, the said parameters preferably consisting of address bits,
  at least one line for addressing data for activating and for deactivating the said shift disabling means, the said data preferably comprising information on the linewise and pointwise shift disabling,
  at least one line for addressing delay selection parameters, intended for at least one of the said delay lines,
  at least one line for addressing state selection parameters, intended for the delay line selection means and/or calculation selection means, and any combination of the said addressing lines.

8. A linear filter for image processing, comprising at least three elementary cells in accordance with claim 1, said elementary cells being arranged in cascade to form a module consisting of an input elementary cell an intermediate elementary cell and an output elementary cell, the said module also comprising addition means linked to the calculation outputs of said elementary cells and having an input linked to the input of said input elementary cell, a circulation output linked to the circulation output of said output elementary cell and a calculation output downstream of the addition means.

9. A module for a linear filter for image processing according to claim 8, wherein said module further comprises random access selection means, in particular for motion compensation, having a first and a second state, the said random access selection means being intended to connect the input of each of said elementary cells to the first input of the adder of said cell in the first state, and the output of at least one of the said delay lines of each of said cells to the first input of the adder of one of said cells in the second state.

10. Linear filter for image processing, comprising at least two modules in accordance with claim 8, the said linear filter also comprising addition means linked to said calculation outputs of at least two of the said modules.

11. Linear filter according to claim 10, wherein the said modules are arranged in cascade and in that the said linear filter also comprises input selection means having a first and a second state, arranged between at least one of the said modules, the so-called upstream module, and the consecutive module, the so-called downstream module, the said input selection means being intended to link the input of the downstream module to the circulation output of the upstream module in the first state, and to an additional input line in the second state.

12. Linear filtering process for image processing comprising:
  sequentially sending data relating to pixels of an image to be processed to inputs of elementary cells in cascade, while respectively imposing, in said elementary cells, transmission delays for the said data,
  performing multiplications by multiplier coefficients in at least one part of said elementary cells on the data received by said elementary cells, so as to obtain products,
  and adding the said products together, wherein in at least one of said elementary cells:
  a main delay and an auxiliary delay less than the said main delay are imposed on the data received by said one elementary cell, by means of two delay lines, respectively main and auxiliary, in parallel,
  the data received by the said one elementary cell are added together, upstream and downstream of the main delay line so as to obtain sums and the said multiplications are performed on the said sums, and
  the data received by the said one elementary cell are transmitted downstream of said one elementary cell, with the said auxiliary delay.

* * * * *